US012695699B2

(12) United States Patent
Jindal et al.

(10) Patent No.: US 12,695,699 B2
(45) Date of Patent: Jul. 28, 2026

(54) GATEWAY MIGRATION BASED ON RESOURCE CONSUMPTION

(71) Applicant: VMware LLC, Palo Alto, CA (US)

(72) Inventors: Gaurav Jindal, Pune (IN); Chandan Ghosh, Bengaluru (IN); Neeraj Mantri, Pune (IN)

(73) Assignee: VMware LLC, Palo Alto, CA (US)

( * ) Notice: Subject to any disclaimer, the term of this patent is extended or adjusted under 35 U.S.C. 154(b) by 119 days.

(21) Appl. No.: 18/651,383

(22) Filed: Apr. 30, 2024

(65) Prior Publication Data

US 2025/0112863 A1     Apr. 3, 2025

(30) Foreign Application Priority Data

Oct. 2, 2023     (IN) .............................. 202341066035

(51) Int. Cl.
*H04L 45/76*          (2022.01)
*H04L 43/16*          (2022.01)
*H04L 45/586*         (2022.01)
*H04L 45/64*          (2022.01)
(52) U.S. Cl.
CPC .............. *H04L 45/76* (2022.05); *H04L 43/16* (2013.01); *H04L 45/586* (2013.01)
(58) Field of Classification Search
CPC ....... H04L 45/76; H04L 45/586; H04L 45/64; H04L 43/16; G06F 9/5083; G06F 2009/4557
See application file for complete search history.

(56) References Cited

U.S. PATENT DOCUMENTS

| | | | | |
|---|---|---|---|---|
| 10,372,490 | B2 * | 8/2019 | Ferris ........................ | G06F 9/50 |
| 10,680,945 | B1 * | 6/2020 | Ye ............................ | H04L 45/42 |
| 11,336,533 | B1 * | 5/2022 | Bogado ................ | H04L 41/122 |
| 2013/0198355 | A1 * | 8/2013 | Kalyanaraman ...... | G06F 9/4856 |
| | | | | 709/223 |

(Continued)

OTHER PUBLICATIONS

Varun, "NSX-T Installation Series: Step 17—Create T0 (Tier-0) Gateway [active-active] and Configure BGP," Technology Blogs—Primarily focusing on Virtualization / Hybrid Cloud, Feb. 11, 2020, NSX-T Installation Series. (Year: 2020).*

(Continued)

*Primary Examiner* — Alina A Boutah
(74) *Attorney, Agent, or Firm* — Quarles & Brady LLP

(57)                  ABSTRACT

Some embodiments provide a novel method for configuring edge routers in a first network. The method configures on a first compute node of the first network (1) a first higher-level edge router and (2) a set of lower-level edge routers. Each lower-level edge router is configured for a different set of subnetworks defined in the first network and is connected to an external second network through the first higher-level edge router. The method detects a condition that requires a particular lower-level edge router for a particular subnetwork to be moved to another compute node. The method configures the particular lower-level edge router to operate on a second compute node below a second higher-level edge router operating on the second compute node to connect the particular lower-level edge router to the external second network.

20 Claims, 14 Drawing Sheets

(56) References Cited

U.S. PATENT DOCUMENTS

| | | | | |
|---|---|---|---|---|
| 2016/0197835 A1* | 7/2016 | Luft | ....................... | H04L 67/10 |
| | | | | 709/223 |
| 2018/0063193 A1* | 3/2018 | Chandrashekhar | ..... | H04L 41/20 |
| 2019/0278631 A1* | 9/2019 | Guim Bernat | .......... | G06F 9/542 |
| 2019/0363977 A1* | 11/2019 | Lim | ....................... | H04L 45/64 |
| 2020/0012505 A1* | 1/2020 | Shil | ....................... | H04L 67/10 |
| 2021/0036889 A1* | 2/2021 | Jain | .................... | H04L 61/2535 |
| 2021/0184914 A1* | 6/2021 | Myneni | .............. | H04L 12/4633 |
| 2021/0311760 A1* | 10/2021 | Oki | ....................... | H04L 41/122 |
| 2021/0314182 A1* | 10/2021 | Basavaraj | .......... | H04L 12/1881 |
| 2021/0314423 A1* | 10/2021 | Rolando | .............. | H04L 45/037 |
| 2022/0019519 A1* | 1/2022 | Gann | ....................... | G06F 8/71 |
| 2022/0029913 A1* | 1/2022 | Lin | ....................... | H04L 12/4633 |
| 2023/0026330 A1* | 1/2023 | Rolando | ................ | H04L 63/20 |
| 2023/0300002 A1* | 9/2023 | Shen | .................... | H04L 47/803 |
| | | | | 709/220 |
| 2023/0367654 A1* | 11/2023 | Kurian | ................. | G06F 9/5083 |
| 2024/0113971 A1* | 4/2024 | Goliya | ................... | H04L 45/76 |
| 2024/0354135 A1* | 10/2024 | Ghosh | ................ | G06F 9/45558 |
| 2024/0356853 A1* | 10/2024 | Ghosh | .................... | H04L 47/12 |

OTHER PUBLICATIONS

Farhan Patel, Networking & Security: "NSX-V to NSX-T Migration using Layer 2 Bridging," VMWare, Jun. 27, 2020 (Year: 2020).*

Eric Shanks, "Tier-0 Gateway," Jul. 14, 2020. (Year: 2020).*

Jaikishan Tayal, "Alternative Solutions for Unsupported Features in VMware NSXMigration for VMware Cloud Director," VMWare Cloud Provider Blog, VMware NSX-V-NSX-T for Cloud Providers, Sep. 26, 2023. (Year: 2023).*

Amit Aneja, "NSX-T: Routing where you need it (Part 1)," (https://blogs.vmware.com/networkvirtualization/author/amit_aneja/), Sep. 7, 2017. (Year: 2017).*

Amit Aneja, "NSX-T: Routing where you need it (Part 2, North-South Routing)," Network and Security Virtualization (https://blogs.vmware.com/networkvirtualization), Jan. 12, 2018. (Year: 2018).*

Tim Burkard, "Demystifying Multi-Tier Gateways in VMware NSX," CXS1822BCN, VMware Explore, 2023. (Year: 2023).*

Gareth Lewis, "VMware NSX for vSphere to NSX-T Migration—End-to-End Fixed Topology," NSX Tutorials, NSX-T, NSX-V, VMware, Oct. 18, 2022 (Year: 2022).*

Wang et al., "Virtual Routers on the Move: Live Router Migration as a Network-Management Primitive," SIGCOMM'08, Aug. 17-22, 2008, Seattle, Washington, USA. Copyright 2008. (Year: 2008).*

* cited by examiner

GATEWAY MIGRATION BASED ON RESOURCE CONSUMPTION

RELATED APPLICATIONS

This application claims priority to Indian Application Serial No. 202341066035 filed Oct. 2, 2023, by VMware LLC, entitled "GATEWAY MIGRATION BASED ON RESOURCE CONSUMPTION," which is hereby incorporated by reference in its entirety for all purposes.

BACKGROUND

In some embodiments, performance of T1 virtual private networks (VPNs) is a component of overall networking performance. A VPC of a public cloud (such as VMC on AWS provided by VMware, Inc.) uses a single edge cluster for all VPNs including T0 and T1. As a cumulative total, all VPN performances are shared. The current goal of some embodiments is to set the north-south bandwidth limit to 1 Gbps (1000 Mbps) for each CFC (Cloud Flex Compute) T1 gateway. Up to 37 Gbps of north-south bandwidth is available to an SDDC at 1500-byte packets. However, performance degrades with smaller packets. With a target of 32 CFCs per SDDC, and assuming the average packet size is less than 1500 bytes, 1 Gbps oversubscribes the SDDC's north-south bandwidth. The Gateway's Quality of Service (QoS) profile defines a hard limit even if there is excess available bandwidth in a gateway. Because of this, an oversubscription is done with the assumption that not all CFCs will be always consuming all of their available bandwidth, while still setting limits to ensure that no CFCs starve out the rest of the CFCs co-located in an SDDC.

Internet connectivity for multiple (e.g., 32) CFCs is achieved using Internet uplinks, but it is not possible through VPNs. Current solutions can only use one SDDC in an optimized way to consume resources optimally, as VPN on an edge gateway is limited to approximately 7 Gbps. The VPNs for CFC are for NATed CGWs (e.g., compute gateways), but the same problem also holds true for routed custom CGWs (e.g., compute gateways). Hence, methods and systems are needed for scaling and optimizing gateways of an SDDC.

BRIEF SUMMARY

Some embodiments provide a novel method for configuring edge routers in a first network. The method configures on a first compute node of the first network (1) a first higher-level edge router and (2) a set of lower-level edge routers. Each lower-level edge router is configured for a different set of subnetworks defined in the first network and is connected to an external second network through the first higher-level edge router. The method detects a condition that requires a particular lower-level edge router for a particular subnetwork to be moved to another compute node. The method configures the particular lower-level edge router to operate on a second compute node below a second higher-level edge router operating on the second compute node to connect the particular lower-level edge router to the external second network.

The method is performed in some embodiments by a set of one or more controllers that configures that first network. In such embodiments, the controller set is managed by a set of one or more management servers that manages the first network and directs the controller set to configure the first network.

In some embodiments, the first network is an underlay network and the different sets of subnetworks are different overlay networks. In such embodiments, each overlay network is defined for a different tenant. In other embodiments, the first network is an overlay network of a first virtual private cloud (VPC) that is defined in a set of one or more datacenters of a cloud, and the different sets of subnetworks are other overlay networks defined for other VPCs defined in the datacenter set. In such embodiments, the first VPC is defined for multiple tenants, while the other VPCs are each defined for a different tenant.

The compute nodes are in some embodiments first and second machines executing on first and second host computers. In such embodiments, each higher-level edge router and its connected lower-level edge routers execute as instances of a single machine on a host computer. Examples of machines include virtual machines (VMs), containers, and pods. In other embodiments, the first and second compute nodes are first and second host computers. In such embodiments, each higher-level edge router and its connected lower-level edge routers execute as individual machines of one host computer.

In some embodiments, each lower-level edge router is a different lower-level edge router for a different tenant. In such embodiments, different tenants' flows can be forwarded through a same higher-level edge router, but are not forwarded through a same lower-level edge router.

In some embodiments, the first and second higher-level edge routers exchange a first set of data message flows between a set of machines of the first network and the external second network, and the set of lower-level edge routers exchange a second set of data message flows between the set of machines of the first network. More specifically, the higher-level edge routers are in some embodiments responsible for north-south traffic (i.e., data message flows exchanged between the first network and the external second network), while the lower-level edge routers are responsible for east-west traffic (i.e., data message flows exchanged within the first network). In some embodiments, the first and second higher-level edge routers are referred to as Tier-0 (T0) gateways, and the set of lower-level edge routers is a set of Tier-1 (T1) gateways (such as T0 and T1 gateways offered by VMware, Inc.). In other embodiments, the first and second higher-level edge routers are referred to as gateways, and the set of lower-level edge routers is referred to as a set of virtual routing and forwarding (VRF) instances.

In some embodiments, the controller set configures the particular lower-level edge router to operate on the second compute node by migrating the particular lower-level edge router from the first compute node to the second compute node. When the particular lower-level edge router is configured as its own machine of a host computer, the controller set migrates the machine. When the particular lower-level edge router is configured as an instance of a machine, the controller set migrates the instance.

The controller set detects the condition in some embodiments by (1) monitoring load on the first higher-level edge router by the set of lower-level edge routers, and (2) determining that the load on the first higher-level edge router has exceeded a particular threshold. In such embodiments, the controller set monitors the higher-level edge routers to ensure that they are not overloaded by the traffic of the lower-level edge routers. In other embodiments, the controller set detects the condition by (1) monitoring load on the first compute node by the set of lower-level edge routers, and (2) determining that the load on the first compute node has exceeded a particular threshold. In such embodiments, the controller set monitors the compute nodes to ensure that they are not overloaded by both the higher-level and lower-level edge routers.

In some embodiments, the controller set also receives configuration data for deploying an additional lower-level edge router in the first network. The configuration data is received in some embodiments by a manager of the first network, which received it from the network administrator. In such embodiments, the controller set examines load on the first and second compute nodes to determine on which compute node to deploy the additional lower-level edge router.

If the controller set determines that the load on the first compute node will not exceed a particular threshold if the additional lower-level edge router is configured on the first compute node, the controller set configures the additional lower-level edge router to operate on the first compute node below the first higher-level edge router operating on the first compute node to connect the additional lower-level edge router to the external second network. Because the first compute node can handle the load of the additional lower-level edge router, the controller set can configure it on the first compute node.

If the controller set determines (1) that the load on the first compute node will exceed a particular threshold if the additional lower-level edge router is configured on the first compute node and (2) that the load on the second compute node will not exceed the particular threshold if the additional lower-level edge router is configured on the second compute node, the controller set configures the additional lower-level edge router to operate on the second compute node below the second higher-level edge router operating on the second compute node to connect the additional lower-level edge router to the external second network. Because the second compute node is still able to handle the load of the additional lower-level edge router, the controller set can configure it on the second compute node.

If the controller set determines that the load on the first compute node and the load on the second compute node will exceed a particular threshold if the additional lower-level edge router is respectively configured on the first compute node or the second compute node, the controller set (1) deploys a third higher-level edge router on a third compute node, and (2) configures the additional lower-level edge router to operate on the third compute node below the third higher-level edge router operating on the third compute node to connect the additional lower-level edge router to the external second network. Because neither the first nor the second compute node is able to handle the load of the additional lower-level edge router, the controller set configures a new higher-level edge router on a new compute node to connect the additional lower-level edge router to the external second network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
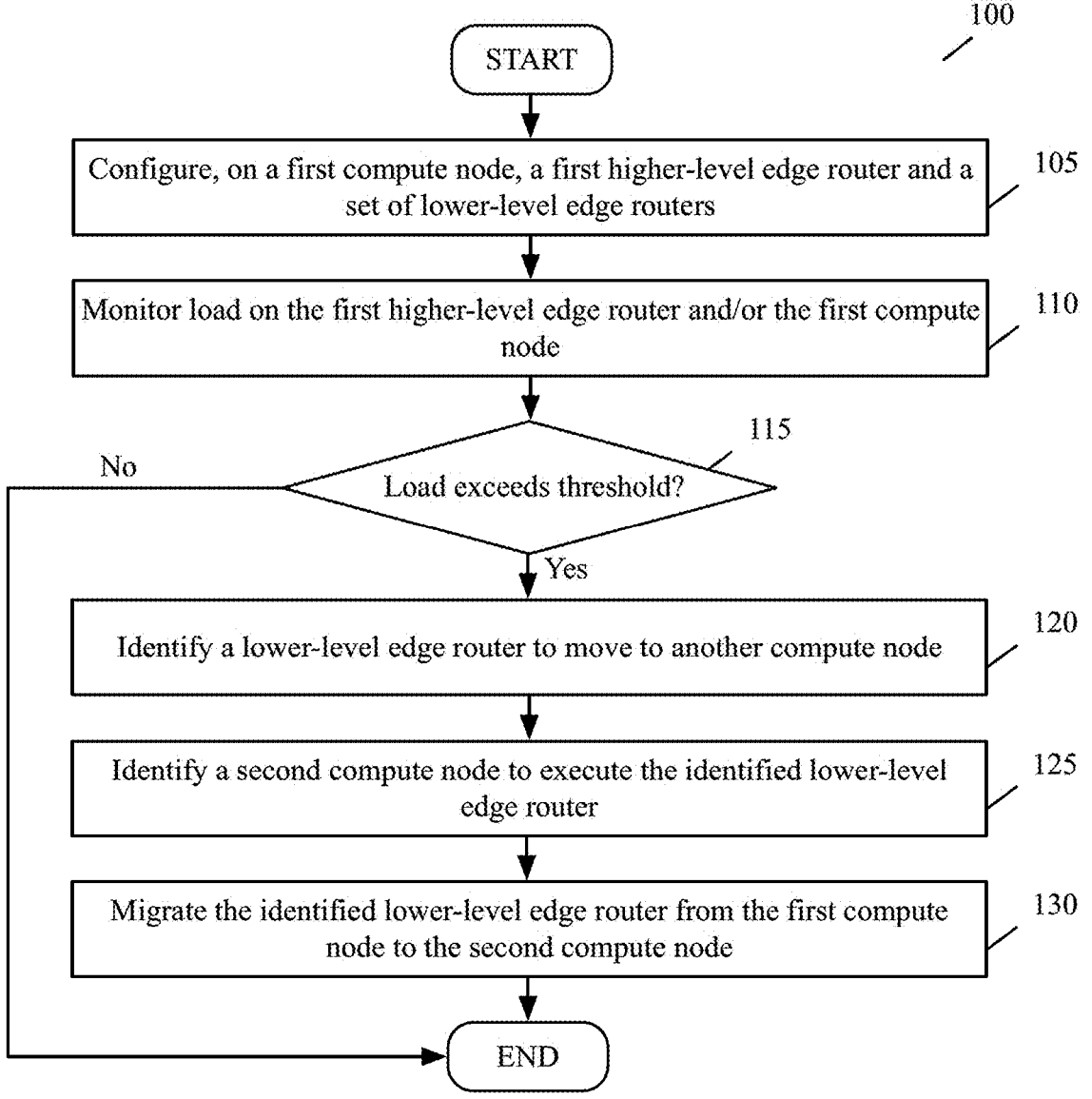
FIG. 1 conceptually illustrates a process of some embodiments for configuring edge routers of a network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for configuring edge routers in a first network. The method configures on a first compute node of the first network (1) a first higher-level edge router and (2) a set of lower-level edge routers. Each lower-level edge router is configured for a different set of subnetworks defined in the first network and is connected to an external second network through the first higher-level edge router. The method detects a condition that requires a particular lower-level edge router for a particular subnetwork to be moved to another compute node. The method configures the particular lower-level edge router to operate on a second compute node below a second higher-level edge router operating on the second compute node to connect the particular lower-level edge router to the external second network.

The method is performed in some embodiments by a set of one or more controllers that configures that first network. In such embodiments, the controller set is managed by a set of one or more management servers that manages the first network and directs the controller set to configure the first network.

In some embodiments, the first network is an underlay network and the different sets of subnetworks are different overlay networks. In such embodiments, each overlay network is defined for a different tenant. In other embodiments, the first network is an overlay network of a first virtual private cloud (VPC) that is defined in a set of one or more datacenters of a cloud, and the different sets of subnetworks are other overlay networks defined for other VPCs defined in the datacenter set. In such embodiments, the first VPC is defined for multiple tenants, while the other VPCs are each defined for a different tenant.

The compute nodes are in some embodiments first and second machines executing on first and second host computers. In such embodiments, each higher-level edge router and its connected lower-level edge routers execute as instances of a single machine on a host computer. Examples of machines include virtual machines (VMs), containers, and pods. In other embodiments, the first and second compute nodes are first and second host computers. In such embodiments, each higher-level edge router and its connected lower-level edge routers execute as individual machines of one host computer.

In some embodiments, the first and second higher-level edge routers exchange a first set of data message flows between a set of machines of the first network and the external second network, and the set of lower-level edge routers exchange a second set of data message flows between the set of machines of the first network. More specifically, the higher-level edge routers are in some embodiments responsible for north-south traffic (i.e., data message flows exchanged between the first network and the external second network), while the lower-level edge routers are responsible for east-west traffic (i.e., data message flows exchanged within the first network). In some embodiments, the first and second higher-level edge routers are referred to as Tier-0 (T0) gateways, and the set of lower-level edge routers is a set of Tier-1 (T1) gateways (such as T0 and T1 gateways offered by VMware, Inc.). In other embodiments, the first and second higher-level edge routers are referred to as gateways, and the set of lower-level edge routers is referred to as a set of virtual routing and forwarding (VRF) instances.

The controller set detects the condition in some embodiments by (1) monitoring load on the first higher-level edge router by the set of lower-level edge routers, and (2) determining that the load on the first higher-level edge router has exceeded a particular threshold. In such embodiments, the controller set monitors the higher-level edge routers to ensure that they are not overloaded by the traffic of the lower-level edge routers. In other embodiments, the controller set detects the condition by (1) monitoring load on the first compute node by the set of lower-level edge routers, and (2) determining that the load on the first compute node has exceeded a particular threshold. In such embodiments, the controller set monitors the compute nodes to ensure that they are not overloaded by both the higher-level and lower-level edge routers.

As used herein, higher-level edge routers (also referred to as high-level routers, gateways, and T0 gateways) refer to routers operating at the boundary between a first network and an external second network that handle north-south traffic exchanged between the first network and the external second network. Lower-level edge routers (also referred to as low-level routers, VRF instances, and T1 gateways) refer to routers operating in the first network that handle east-west traffic exchanged between network elements (e.g., machines) in the first network.

FIG. 1 conceptually illustrates a process 100 for configuring edge routers in a first network. The process 100 is performed in some embodiments by a set of one or more controllers that configures the first network. In some embodiments, the first network is an underlay network that includes one or more overlay networks. In other embodiments, the first network is an overlay network of a first VPC defined in a set of one or more datacenters of a cloud, and the overlay network includes one or more other overlay networks defined for one or more other VPCs defined in the set of datacenters.

The process 100 begins by configuring (at 105), on a first compute node of the first network, a first higher-level edge router and a set of lower-level edge routers. The controller set configures the first compute node with the set of lower-level edge routers such that each lower-level edge router is configured for a different set of subnetworks defined in the first network and is connected to one or more external networks through the first higher-level edge router. When the first network is an underlay network, the different sets of subnetworks are different overlay networks. When the first network is an overlay network of a VPC of a datacenter set, the different sets of subnetworks are different overlay networks defined for other VPCs of the datacenter set.

In some embodiments, the higher-level edge routers configured in the first network are T0 gateways, and the lower-level edge routers configured in the first network are T1 gateways. In other embodiments, the higher-level edge routers configured in the first network are gateways, and the lower-level edge routers configured in the first network are VRF instances. Each higher-level edge router deployed in the first network is responsible for exchanging data message flows between machines (e.g., VMs, containers, pods) of the first network and the one or more external networks (i.e., north-south traffic). Each lower-level edge router deployed in the first network is responsible for exchanging data message flows between the machines of the first network (i.e., east-west traffic).

Different lower-level edge routers are in some embodiments configured for different tenants. In such embodiments, a particular tenant's traffic is associated with its own lower-level edge router and is associated with a higher-level edge router that can be shared by one or more other tenants' traffic. Conjunctively or alternatively, different lower-level edge routers are configured for different organizations (e.g., departments) of an entity. Examples of an entity include a business entity (e.g., a corporation), a non-profit entity (e.g., a hospital, a research organization, etc.), an educational entity (e.g., a university, a college, etc.), or any other type of entity.

Next, the process 100 monitors (at 110) load on the first higher-level edge router and/or the first compute node. The controller set of some embodiments collects metrics related to resources (e.g., CPU, memory, bandwidth usage, capacity, etc.) of the first higher-level edge router and/or the first compute node to determine whether the resources are being overconsumed by the set of lower-level edge routers and/or other machines in the first network. For instance, the controller set in some embodiments collects, from a metrics collector operating within or alongside the first compute node, metrics related to the load at least one of the first higher-level edge router and the first compute node. The controller set also identifies configuration information for the first higher-level edge router and the first compute node to determine the amount of each resource allotted to them (e.g., the total amount of allotted CPU, the total allotted amount of memory, etc.). Based on the collected metrics and the configuration information, the controller set is able to determine the load on the first higher-level edge router and the first compute node. Any suitable metrics related to compute nodes, edge routers, and the data message flows traversing the edge routers can be collected for monitoring by the controller set.

The controller set in some embodiments monitors the first higher-level edge router to ensure that the set of lower-level edge routers is not overloading the first higher-level edge router. Conjunctively or alternatively, the controller set monitors the first compute node to ensure that both the first higher-level edge router and the set of lower-level edge routers are not overloading the first compute node.

At 115, the process 100 determines whether the load on the first higher-level edge router and/or the first compute node exceeds a particular threshold. In some embodiments, the controller set compares a determined load of the first higher-level edge router and/or the first compute node to the particular threshold to determine whether the load is more than it should be. For example, the controller set in some embodiments determines that the amount of CPU used by the set of lower-level edge routers on the first higher-level edge router exceeds the particular threshold when it exceeds 80%. As another example, the controller set in some embodiments determines that the memory used by the set of lower-level edge routers and the first higher-level edge router on the first compute node exceeds the particular threshold when it exceeds 75%. Any suitable threshold amount for any suitable metric can be examined by the controller set.

If the process 100 determines that the load on the first higher-level edge router and/or the first compute node does not exceed the particular threshold, the process 100 ends. Because the controller set determines that the first higher-level edge router and/or the first compute node are not overloaded, the controller set does not need to move any of the lower-level edge routers from the first compute node to another compute node.

If the process 100 determines that the load on the first higher-level edge router and/or the first compute node does exceed the particular threshold, the process 100 identifies (at 120) a lower-level edge router to move to another compute node. In detecting that either or both of the first higher-level edge router and the first compute node are overloaded, the controller set detects a condition that requires a lower-level edge router for a subnetwork to be moved to another compute node. In some embodiments, the controller set only identifies one lower-level edge router to move. In other embodiments, the controller set identifies a set of lower-level edge routers to move. In some of these embodiments, this is due to the controller set determining that multiple lower-level edge routers need to be moved from the first compute node in order to alleviate the load on the first higher-level edge router and/or the first compute node enough so they don't exceed the particular threshold.

At 125, the process 100 identifies a second compute node to execute the identified lower-level edge router. The controller set of some embodiments identifies the second compute node as already deploying a second higher-level edge router for the first network. In such embodiments, the controller set does not need to configure an additional higher-level edge router in the first network. In other embodiments, the controller set identifies the second compute node, but it does not already deploy a second higher-level edge router for the first network. In such embodiments, the controller set configures the second higher-level edge router on the second compute node after identifying the second compute node to execute the identified lower-level edge router.

Lastly, the process 100 migrates (at 130) the identified lower-level edge router from the first compute node to the second compute node. After identifying the lower-level edge router and the second compute node (and configuring the second higher-level edge router, in some embodiments), the controller set configures the identified lower-level edge router to operate on the second compute node below the second higher-level edge router operating on the second compute node to connect the identified lower-level edge router to the one or more external networks. By migrating the identified lower-level edge router to the second compute node, the controller set alleviates the load on both the first higher-level edge router and the first compute node. After migrating the identified lower-level edge router, the process 100 ends.

In some embodiments, the steps 110-130 are performed periodically for the controller set to continuously monitor the load on the first compute node and/or the first higher-level edge router. In such embodiments, one or more lower-level edge routers can increase or decrease the amount of resources of the first higher-level edge router and the first compute node they use based on the amount of traffic they are exchanging with the one or more external networks. As such, the controller set continuously monitors the load. The controller set in some embodiments monitors the load on each compute node and/or each higher-level edge router in the first network to detect when lower-level edge routers need to be migrated.

The first and second compute nodes are in some embodiments first and second machines (e.g., VMs, containers, pods). In such embodiments, before the migration, the first machine implements the first higher-level edge router and each of the set of lower-level edge routers. After the migration, the first machine implements the first higher-level edge router and each of the set of lower-level edge routers except for the identified lower-level edge router, and the second machine implements the second higher-level edge router and the identified lower-level edge router. The first and second machines can execute on one host computer or on different host computers.

In other embodiments, the first and second compute node are first and second host computers. In such embodiments, before the migration, the first host computer executes the first higher-level edge router and each of the set of lower-level edge routers as one or more machines. After the migration, the first host computer implements the first higher-level edge router and each of the set of lower-level edge routers except for the identified lower-level edge router as one or more machines, and the second host computer implements the second higher-level edge router and the identified lower-level edge router as one or more machines.

Figure 2A:
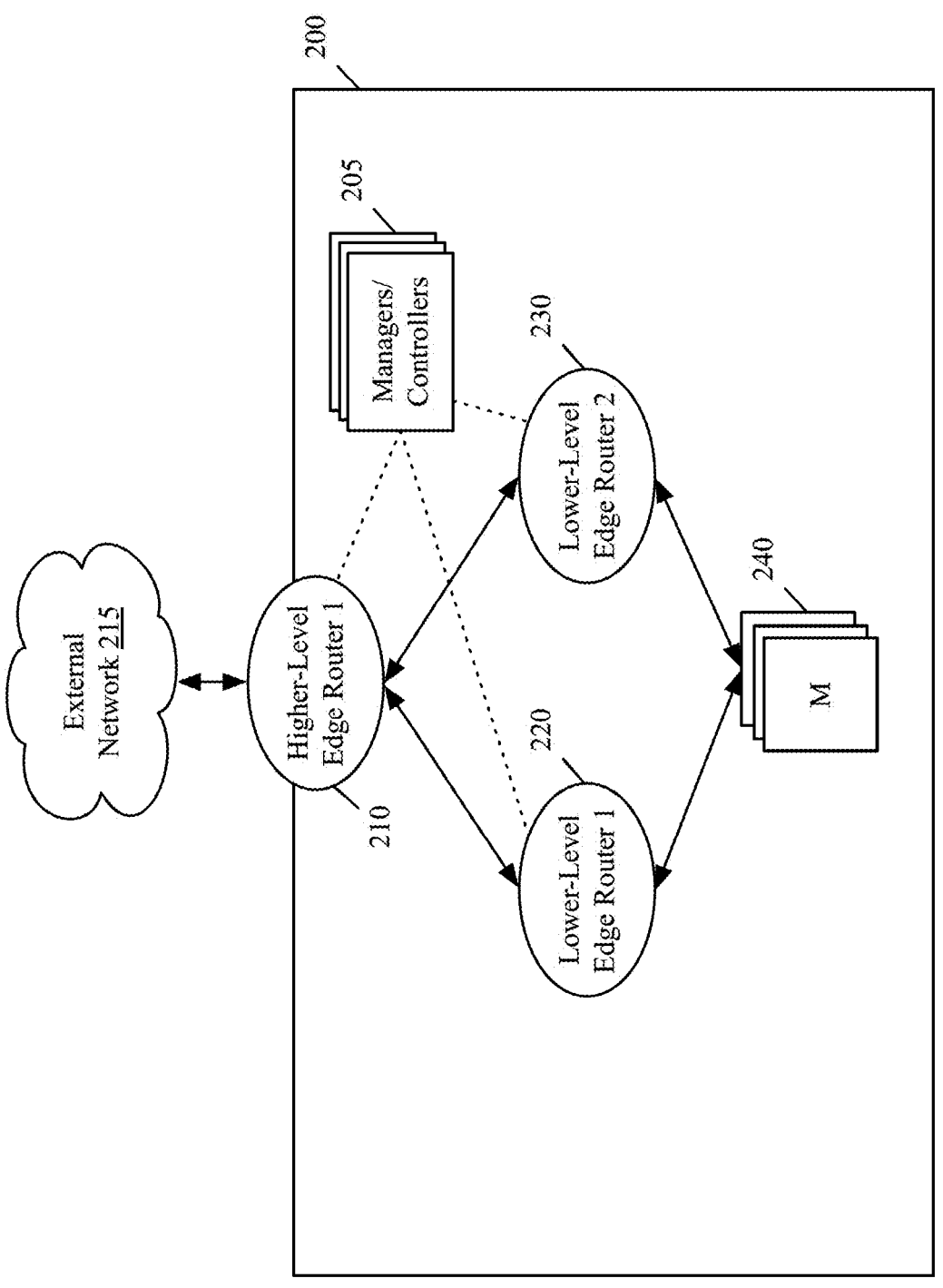
FIGS. 2A-B illustrate an example network configured by a set of managers and controllers.
Figure 2B:
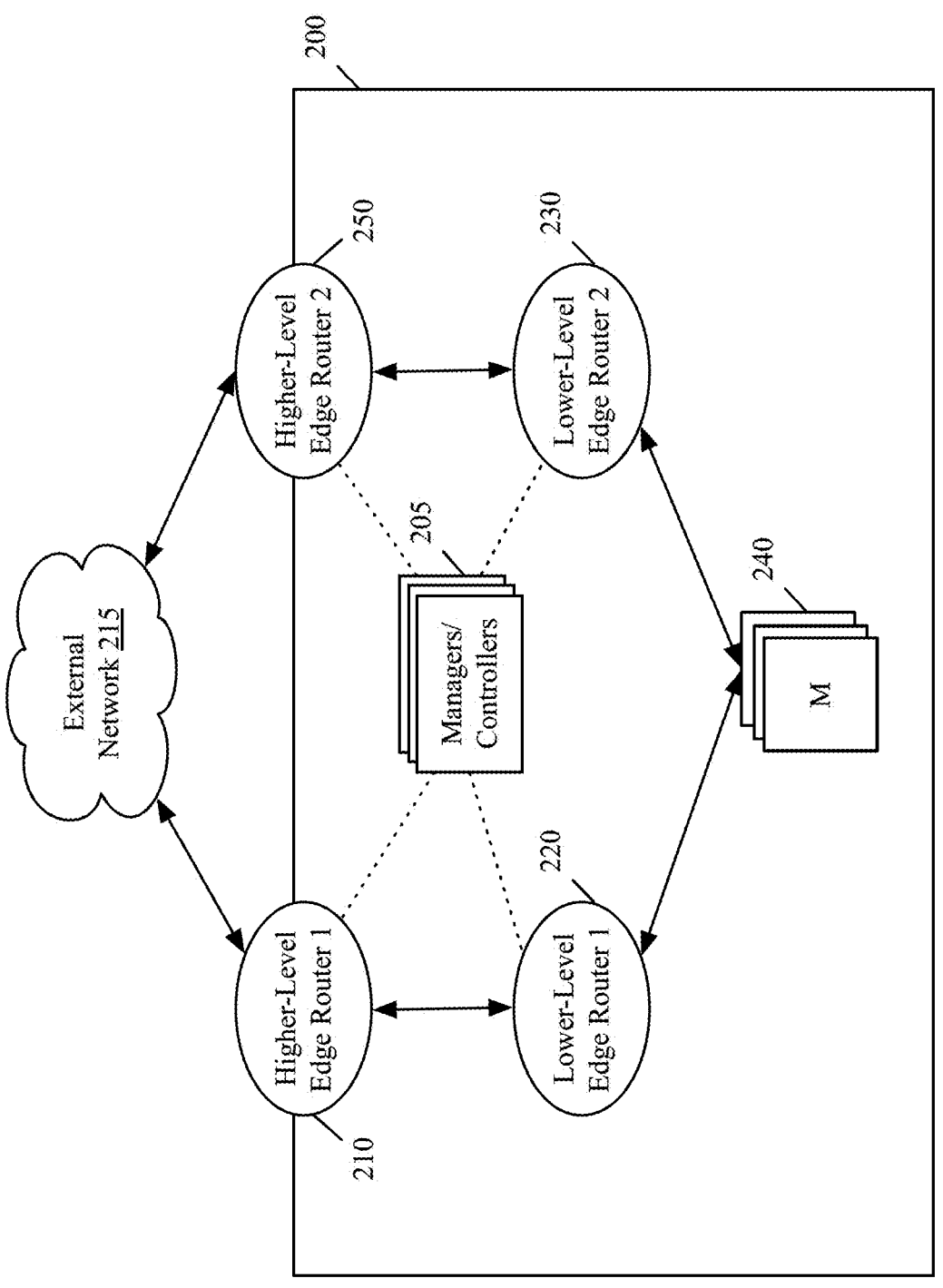

FIG. 2A-B illustrate an example network 200 configured by a set of one or more managers and controllers 205. The network 200 communicates with an external network 215. FIG. 2A illustrates the network 200 when the manager and controller set 205 configures a first higher-level edge router 210 in the first network and two lower-level edge routers 220-230. A set of machines 240 exchange data message flows (1) with each other through the lower-level edge routers 220-230 and (2) with the external network 215 through the lower-level edge routers 220-230 and the higher-level edge router 210.

In this example, the manager and controller set 205 monitors the load on the higher-level edge router 210 by the lower-level edge routers 220-230. In some embodiments, the manager and controller set 205 does this by collecting metrics (e.g., from metrics collection agents operating on the same compute nodes as the edge routers 210-230). The manager and controller set 205 determines that one of the lower-level edge routers 220 or 230 needs to be associated with a different higher-level edge router in the network 200, as the load on the higher-level edge router 210 is exceeding a particular threshold (e.g., defined by a network administrator).

FIG. 2B illustrates the network 200 after the manager and controller set 205 has deployed a second higher-level edge router 250 in the network 200 and migrated the second lower-level edge router 230 to the second higher-level edge router 250. After performing this configuration change of the network 200, the first higher-level edge router 210 is only associated with the first lower-level edge router 220, alleviating the load on the first higher-level edge router 210.

In some embodiments, rather than deploying a new higher-level edge router to alleviate load on an already deployed higher-level edge router, some embodiments instead increase the amount of resources allotted to the already deployed high-level edge router. For example, a controller set in some embodiments determines that a set of lower-level edge routers is using more than a threshold amount of memory of a particular higher-level edge router. Instead of deploying a new higher-level edge router and migrating one or more of the lower-level edge routers to the new higher-level edge router, the controller set in some embodiments increases the amount memory allotted to the particular higher-level edge router. After doing this, the set of lower-level edge routers is no longer using more memory of the particular higher-level edge router than it should.

Figure 3:
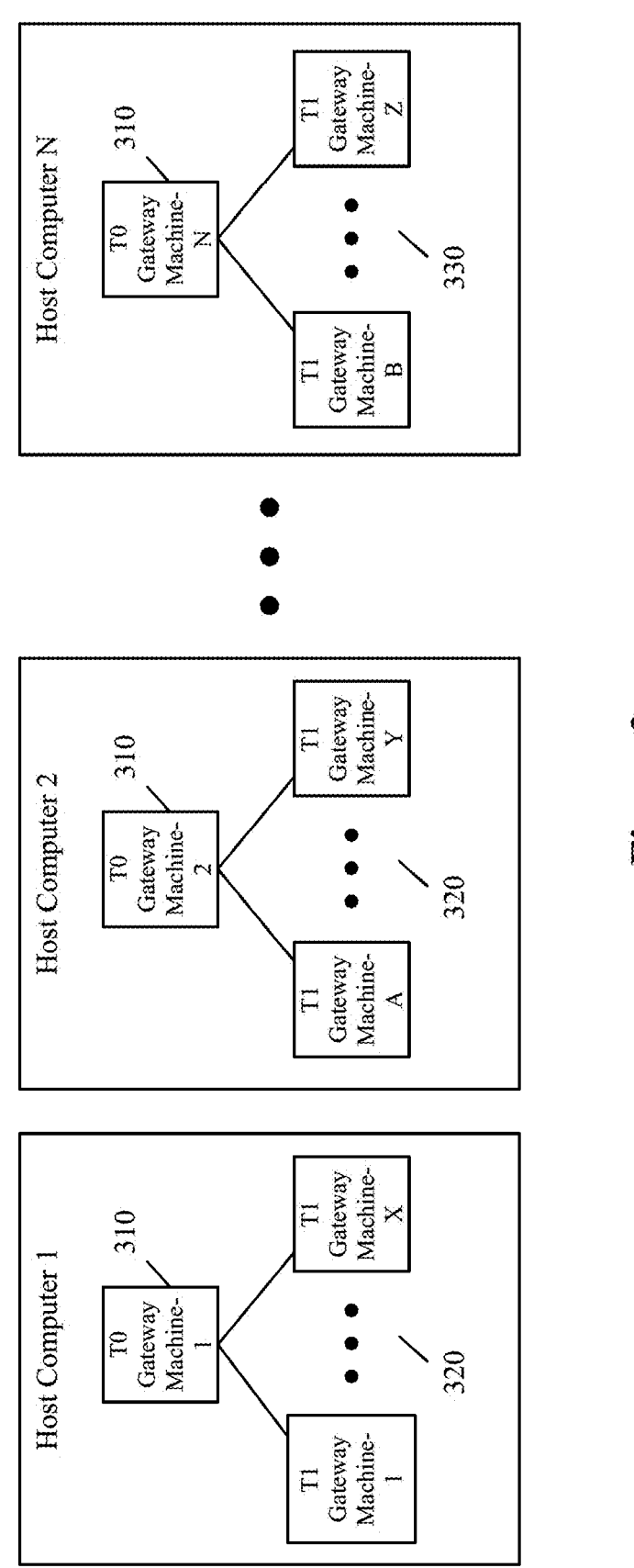
FIG. 3 an example set of host computers executing T0 and T1 gateways for a network.

As discussed previously, higher-level edge routers and lower-level edge routers can execute on a same host computer or within a same VM. FIG. 3 illustrates an example set of one or more host computers 300 executing as part of a network (not shown). The network can include any number of host computers 300 executing gateways for the network and any number of other host computers (not shown) that do not execute gateways for the network (e.g., other host computers executing source and destination machines).

Each host computer 300 includes a T0 gateway machine 310 and a set of one or more T1 gateway machines 320. Each T0 gateway machine 310 is a machine (e.g., VM, container, pod) executing on one of the host computers 300 to provide edge services to the network. Each T1 gateway machine 320 is a machine (e.g., VM, container, pod) executing on one of the host computers 300 and connecting to one of the T0 gateway machines 310. In this example, each T0 and T1 gateway in the network is implemented by its own machine.

In this example, each host computer 300 executes one T0 gateway machine 310 and can execute any number of T1 gateway machines 320. However, in other embodiments, a host computer of a network can execute multiple T0 gateway machines.

Figure 4:
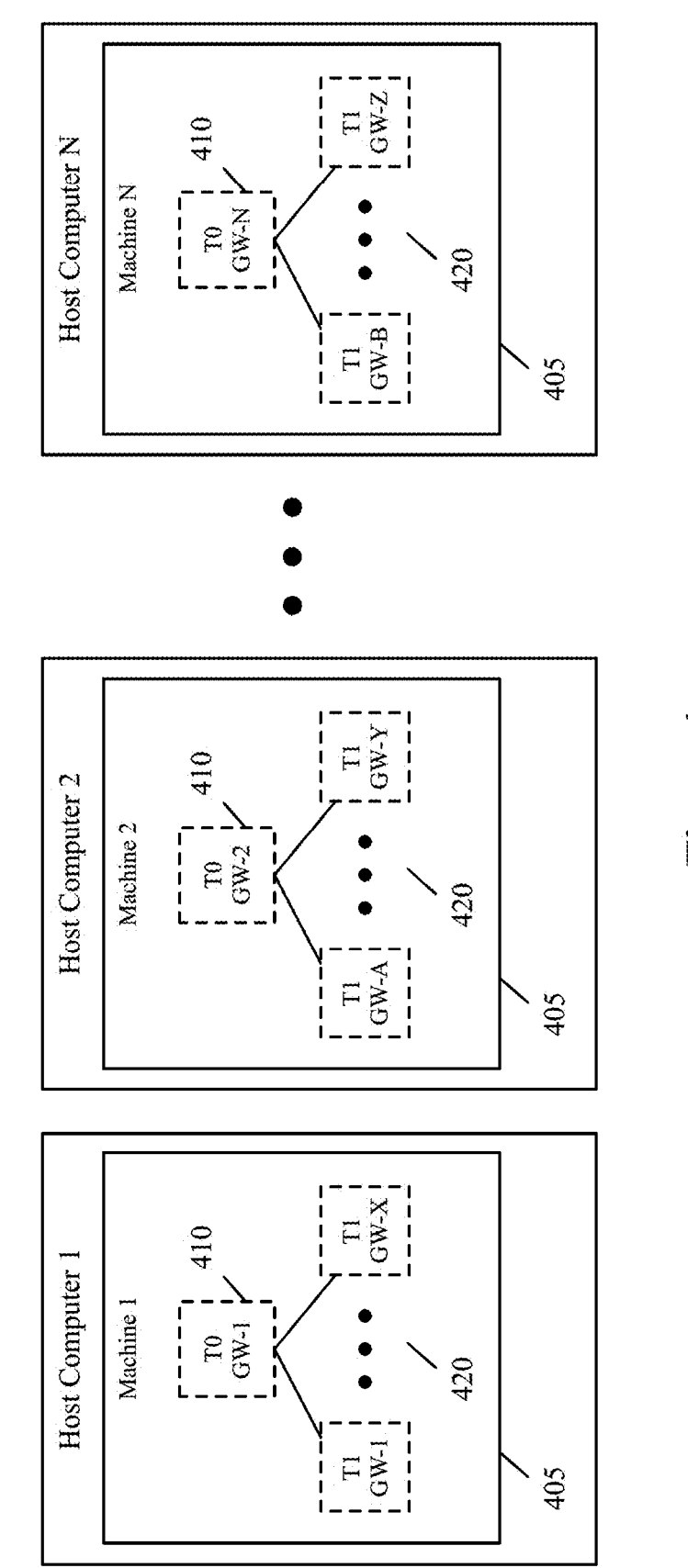
FIG. 4 another example set of host computers executing T0 and T1 gateways for a network.

FIG. 4 illustrates another example set of one or more host computers 400 executing as part of a network (not shown). The network can include any number of host computers 400 executing gateways for the network and any number of other host computers (not shown) that do not execute gateways for the network (e.g., other host computers executing source and destination machines).

In this example, each host computer 400 executes a machine 405 (e.g., VM, container, pod). Each machine 405 executes a T0 gateway 410 and a set of one or more T1 gateways 420 (e.g., each machine 405 executes an instance to implement a T0 gateway 410 and a set of one or more other instances to implement one or more T1 gateways 420).

Each T0 gateway 410 executes within one of the machines 405 to provide edge services to the network. Each T1 gateway 420 executes within one of the machines and connects to one of the T0 gateways 410. In this example, each host computer 400 executes one machine 405 to implement the T0 gateway 410 and T1 gateways 420 executing on the host computer.

While the above described embodiments of FIGS. 3 and 4 illustrate a host computer executing T0 and T1 gateways as individual machines or as instances of a single machine, a host computer in other embodiments executes gateways and VRF instances as individual machines or as instances of a single machine.

Figure 5:
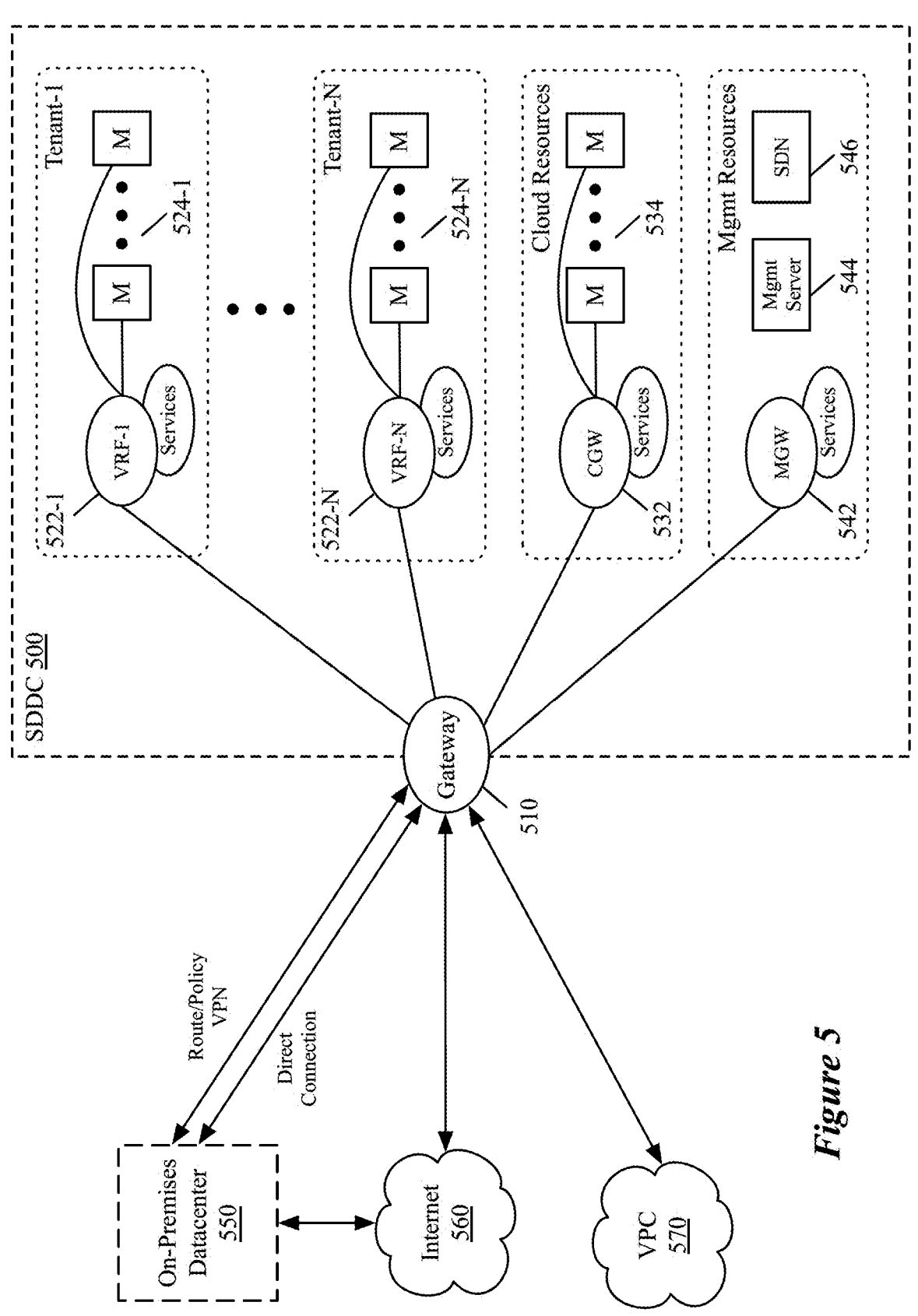
FIG. 5 illustrates an example SDDC that connects to an on-premises datacenter and a VPC.

As discussed previously, some embodiments configure higher-level edge routers to connect to different lower-level edge routers deployed for different tenants. FIG. 5 illustrates an example software-defined datacenter (SDDC) 500 that connects to an on-premises datacenter 550 and a VPC 570.

The SDDC 500 includes different resources 522-524 for different tenants. Each tenant is associated with its own VRF 522 and a set of one or more machines 524. For example, tenant-1 has their own VRF 522-1 and set of machines 524-1. Each VRF 522 (also referred to as a T1 gateway, in some embodiments) handles east-west traffic for the tenant. The machines 524 (e.g., VMs, containers, pods) are the sources and destinations of the tenant's data message flows.

The SDDC 500 also includes a set of cloud resources including a cloud gateway (CGW) 532 and a set of one or more cloud machines 534. The CGW 532 is a default compute T1 gateway provisioned for instantiating machines (e.g., machines 524 or 534) in the SDDC 500. The cloud resources 532-534 are provided by a particular public cloud provider. Examples of public cloud providers include Amazon Web Services (AWS), Google Cloud Platform (GCP), Microsoft Azure, etc.

The SDDC 500 also includes a set of management network resources including a management gateway (MGW) 542, a management server 544, and a software-defined network (SDN) 546. The MGW 542 is a T1 management gateway beside which all management components 544 and 546 (and, in some embodiments, a manager of the SDDC 500) reside. In some embodiments, the management server 544 and SDN 546 are respectively a vCenter server and an NSX environment offered by VMware, Inc.

The SDDC 500 also includes a gateway 510 (also referred to as a T0 gateway, in some embodiments) that handles north-south traffic for each of the tenants 1-N of the SDDC 500. In some embodiments, the gateway 510 is implemented as an individual machine (e.g., VM, container, pod) executing on a host computer. In some of these embodiments, the VRFs 522 execute as individual machines executing on the same host computer. Alternatively, the gateway 510 and the VRFs 522 are implemented as instances of a single machine executing on a host computer. In all of these embodiments, one or more of the machines 524 and 534 can execute on the same host computer as the gateway 510 and VRFs 522, or can execute on a set of host computers not including the host computer executing the gateway 510 and VRFs 522.

The SDDC 500 is in some embodiments managed and controlled by a set of managers and controllers (not shown), and communicates with the on-premises datacenter 550 and the VPC 570 using the gateway 510. In a default configuration, the SDDC 500 includes one gateway 510 and a different VRF 522 for each tenant of the SDDC 500.

Other gateways and VRFs may be added to the SDDC 500 as necessary (e.g., if the gateway 510 is being overloaded with traffic, if there is a new tenant of the SDDC 500, etc.).

To connect to external networks, the gateway 510 includes a set of one or more interfaces (also referred to as uplinks or uplink interfaces). For example, the gateway 510 in some embodiments includes (1) a VPC interface (also referred to as a cross-VPC interface) to connect to the VPC 570, (2) an Intranet interface to connect to the on-premises datacenter 550, and (3) an Internet interface to also connect to the on-premises datacenter 550 through the public Internet 560.

When creating the SDDC 500, some embodiments pre-allocate elastic network interfaces (ENIs) in the VPC 570. Each ENI is assigned an Internet Protocol (IP) address from a subnet specified at creation of the SDDC 500, and each host (not shown) of the SDDC 500 attaches to one of the ENIs. In some embodiments, an additional IP address is assigned to an ENI where the edge appliance (running the gateway 510 and VRFs 522) connects (e.g., the host computer executing one or more machines implementing the gateway 510 and VRFs 522). This connection to the VPC 570 supports network traffic between the machines 524 and native public cloud service endpoints (e.g., native AWS service endpoints offered by AWS). A route table of the VPC 570 is aware of the VPC's primary subnet, as well as all subnets of the SDDC 500.

To connect the SDDC 500 to the on-premises datacenter 550, different embodiments create a virtual private network (VPN) that uses the Internet 560, a VPN that directly connects to the on-premises datacenter 550, or a direct connection to the on-premises datacenter 550. These VPNs may be Internet Protocol Security (IPsec) VPNs, and can be policy-based or route-based. Directly connecting to the on-premises datacenter 550 creates a high-speed, low-latency connection with the on-premises datacenter 550, rather than using the public Internet 560.

The gateway 510, VRFs 522, CGW 532, and MGW 542 in some embodiments, each performs one or more services (e.g., middlebox services). Examples of middlebox services include firewall services, load balancing services, network address translation (NAT) services, Intrusion Detection System (IDS) services, and Intrusion Prevention System (IPS) services. And any other middlebox services that can be performed by a gateway or edge router.

In some embodiments, routed CGWs are connected to an SDN's overlay network. Workload VMs behind routed CGWs can communicate with other CGWs' (including the default CGW) workloads. Workload VMs can also reach the Internet using Elastic IP (EIP). Tenants in some embodiments configure route aggregation to enable routed CGW workloads to communicate over transit connections and/or direct connections (i.e., Intranet endpoint) or connected VPC (i.e., services endpoint). In such embodiments, the explicitly configured network addresses in route aggregation prefix lists are advertised externally, giving tenants fine-grained control over reachability to workloads on additional CGWs.

Network address translated CGWs (i.e., NATed CGWs) require NAT to be configured to ensure connectivity to the SDDC's SDN overlay network. As with routed CGWs, workloads on NATted CGWs can communicate externally when using route aggregation. Addresses behind the NATed CGW are not advertised, which enables creation of overlapping CIDRs in an SDDC. This capability is useful for tenants in some embodiments when supporting tenants or applications with overlapping IP addresses. As such, tenants avoid renumbering (reassigning IP addresses) their applications when they migrate them to the cloud and save a significant amount of time, effort, and risk.

Figure 6:
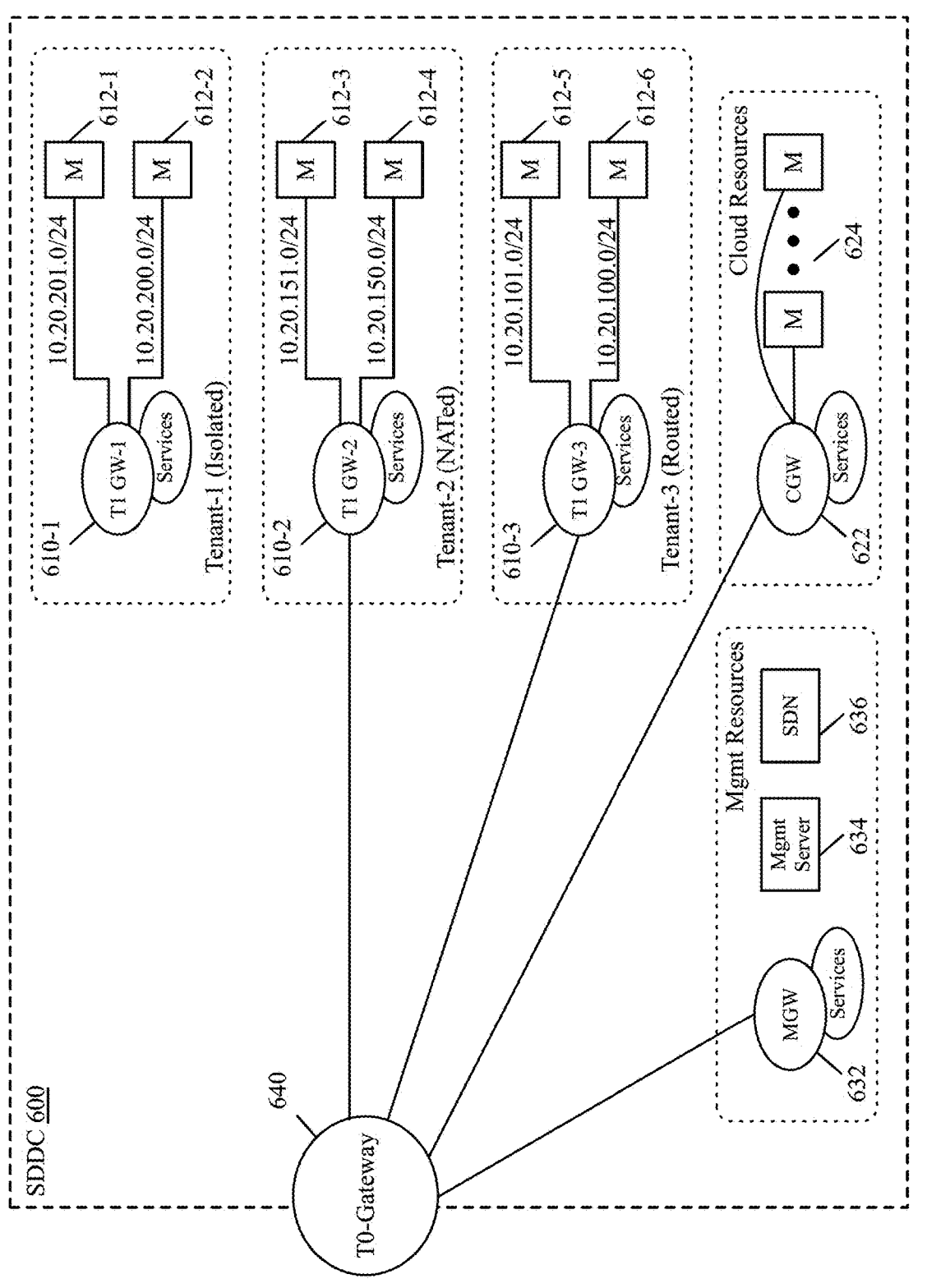
FIG. 6 illustrates an example SDDC configured for three tenants.

FIG. 6 illustrates another example SDDC 600. In this example, the SDDC 600 is configured for three tenants 1-3. Each tenant has their own T1 gateway 610 and machines 612. In this example, each tenant has two machines. Tenant-1 has machines 610-1 and 610-2, Tenant-2 has machines 610-3 and 610-4, and Tenant-3 has machines 610-5 and 610-6.

The SDDC 600 also includes a set of cloud resources including a CGW 622 and a set of one or more cloud machines 624. The CGW 622 is a default compute T1 gateway provisioned for instantiating machines (e.g., machines 612 or 624) in the SDDC 600. The cloud resources 622-624 are provided by a particular public cloud provider. Examples of public cloud providers include AWS, GCP, Microsoft Azure, etc.

The SDDC 600 also includes a set of management network resources including an MGW 632, a management server 634, and an SDN 636. The MGW 632 is a T1 management gateway beside which all management components 634 and 636 (and, in some embodiments, a manager of the SDDC 600) reside. In some embodiments, the management server 634 and SDN 636 are respectively a vCenter server and an NSX environment offered by VMware, Inc.

In some embodiments, each of the T1 gateways 610, CGW 622, and MGW 632 performs one or more services (e.g., middlebox services) on data messages it forwards. The SDDC 600 also includes a T0 gateway 640 for handling traffic sent to and from the SDDC 600.

In this example, Tenant-1 is an isolated tenant, Tenant-2 is a NATed tenant, and Tenant-3 is a routed tenant. A routed tenant's connected segments have a unique IP address segment. Routed T1 segments are global to the SDDC 600, and its IP addresses do not overlap with other segments under different T1 gateways, with SDDC management CIDRs, and across VPC CIDRs. When a tenant is routed, the connected T0 gateway performs NAT services for the tenant.

A NATed tenant has their T1 gateway assigned a default NAT IP address. A routed tenant's segment is unique within their T1 gateway. For a NATed tenant, both their T1 gateway and the connected T1 gateway perform NAT services. A gateway firewall service is also implemented on both the T1 and T0 gateways.

An isolated tenant does not connect to a T0 gateway (as shown with Tenant-1). In some embodiments, an isolated tenant can connect through API actions, and can connect as a routed network or a NATed tenant. If the tenant is connected as a routed tenant, the tenant's IP CIDR is first checked for uniqueness. If the tenant is connected is a NATed tenant, a NAT IP address is allocated to the tenant and a NAT rule on the tenant's T1 gateway is installed.

Figure 7:
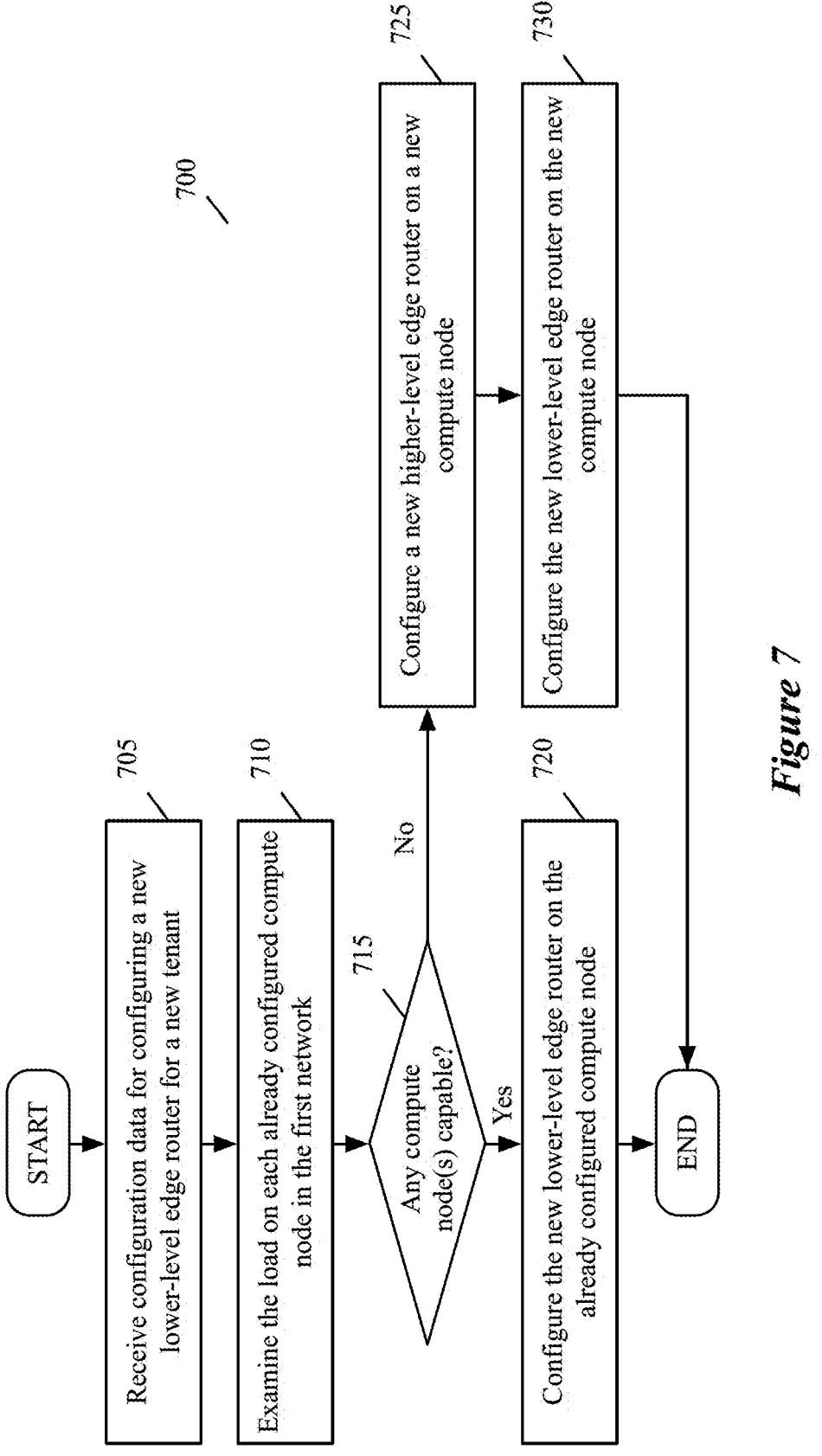
FIG. 7 conceptually illustrates a process of some embodiments for adding new tenants to a first network that connects to one or more external networks.

In some embodiments, when a new tenant joins a network, the controller set of that network configures a new lower-level edge router for the new tenant's traffic. FIG. 7 conceptually illustrates a process 700 of some embodiments for adding new tenants to a first network that connects to one or more external networks. The process 700 is performed in some embodiments by a set of one or more controllers that configures the first network. In some embodiments, the process 600 is performed after the controller set has configured, on each of a set of one or more compute nodes of the first network, a higher-level edge router to handle north-south traffic and a set of one or more lower-level edge routers to handle east-west traffic. Each lower-level edge router is associated with a different tenant.

In some embodiments, each compute node of the first network is a host computer. In such embodiments, each host computer executes a set of machines (e.g., VMs, containers, pods) to implement a higher-level edge router and its connected set of lower-level edge routers. In other embodiments, each compute node of the first network is a machine. In such embodiments, each machine executes a set of instances to implement a higher-level edge router and its connected set of lower-level edge routers.

The process 700 begins by receiving (at 705) configuration data for configuring a new lower-level edge router for a new tenant. The controller set of some embodiments receives configuration data from a set of one or more management servers of the first network, which received it from a network administrator of the first network. In some embodiments, the configuration data specifies (1) one or more machines (e.g., one or more machine network addresses, such as IP addresses) associated with the new tenant, (2) a particular subnetwork of the first network associated with the new tenant, and/or (3) one or more services (e.g., middlebox services) the new lower-level edge router is to perform on one or more of the new tenant's data message flows. Any suitable configuration data used by a controller set for configuring an edge router can be received.

Next, the process 700 examines (at 710) the load on each already configured compute node in the first network. For each compute node already configured with a higher-level edge router for the first network, the controller set examines the load so it can determine whether any of these compute nodes are capable of handling the load of the new tenant's traffic. To do this, the controller set in some embodiments collects metrics related to one or more attributes of each compute node, each higher-level edge router, and/or each data message flows traversing the first network. In some embodiments, the controller set collects these metrics from one or more metrics collection agents executing within or alongside each compute node. Examples of metrics used to examine the load on compute nodes includes memory usage metrics, CPU usage metrics, bandwidth usage metrics, etc.

At 715, the process 700 determines whether any of the already configured compute nodes are capable of handling the traffic of the new tenant's new low-level edge router. The controller set determines whether any compute node can handle the load of the new low-level edge router without getting overloaded. In some embodiments, the controller set determines whether each compute node's load will exceed a particular threshold if the new low-level edge router is configured on it.

If the process 700 determines that an already configured compute node is capable of handling the load of the new lower-level edge router (i.e., that the already configured compute node will not exceed the particular threshold if the new lower-level edge router is configured on it), the process 700 configures (at 720) the new lower-level edge router on the already configured compute node. Because one of the already configured compute nodes can handle the load of the new lower-level edge router, the controller set does not have to configure a new compute node or a new higher-level edge router for the new lower-level edge router. As such, the controller set configures the new low-level edge router to operate on the already configured compute node below its higher-level edge router operating to connect the new lower-level edge router to the one or more external networks, and this higher-level edge router will handle the new tenant's north-south traffic.

In some embodiments, the controller set identifies two or more already configured compute nodes that are capable of handling the load of the new lower-level edge router. In some of these embodiments, the controller set deterministically or non-deterministically determines which of these compute nodes to configure the new lower-level edge router. Alternatively, the controller set determines which of these compute nodes will have the lowest load percentage if the new lower-level edge router is configured on it, and selects that compute node. Any suitable method for selecting one compute node out of a set of two or more compute nodes may be used.

When the already configured compute node is a host computer, the controller set configures the new lower-level edge router as a new machine executing on the host computer. When the already configured compute node is a machine, the controller set configures the new lower-level edge router as a new instance executing on the machine. After configuring the new lower-level edge router on the already configured compute node, the process 700 ends.

If the process 700 determines that none of the already configured compute nodes are capable of handling the load of the new lower-level edge router (i.e., that each of the already configured compute nodes will exceed the particular threshold if the new lower-level edge router is configured on it), the process 700 configures (at 725) a new higher-level edge router on a new compute node. Because none of the compute nodes already configured with a higher-level edge router can handle the load of the new low-level edge router for the new tenant, the controller set must configure a new high-level edge router to connect to the new low-level edge router.

Whether or not the controller set configures edge routers as different machines of host computers or as different instances of machines, the controller set of some embodiments configures the new higher-level edge router as a new machine executing on a new host computer. This is because the new machine can be configured to implement the new lower-level edge router as well as the new-higher-level edge router when the controller set configures edge routers as instances of machines instead of individual machines.

After configuring the new high-level edge router on the new compute node, the process 700 configures (at 730) the new lower-level edge router on the new compute node.

When the new compute node is a host computer, the controller set configures the new lower-level edge router as a new machine executing on the host computer. When the new compute node is a machine, the controller set configures the new lower-level edge router as a new instance executing on the machine executing the new higher-level edge router.

The controller set configures the new low-level edge router to operate on the new compute node below the new higher-level edge router operating on the new compute node to connect the new lower-level edge router to the one or more external networks. As such, the new tenant's north-south traffic will be handled by the new high-level edge router. After configuring the new lower-level edge router on the new compute node, the process 700 ends.

As described above, some embodiments examine the load on compute nodes to determine where to configure new lower-level edge routers for tenants. conjunctively or alternatively, some embodiments examine the load on higher-level edge routers to determine this. In such embodiments, the controller set collects metrics related to each higher-level edge router already configured in the first network to determine whether any of them can handle the load of the new lower-level edge router.

Figure 8A:
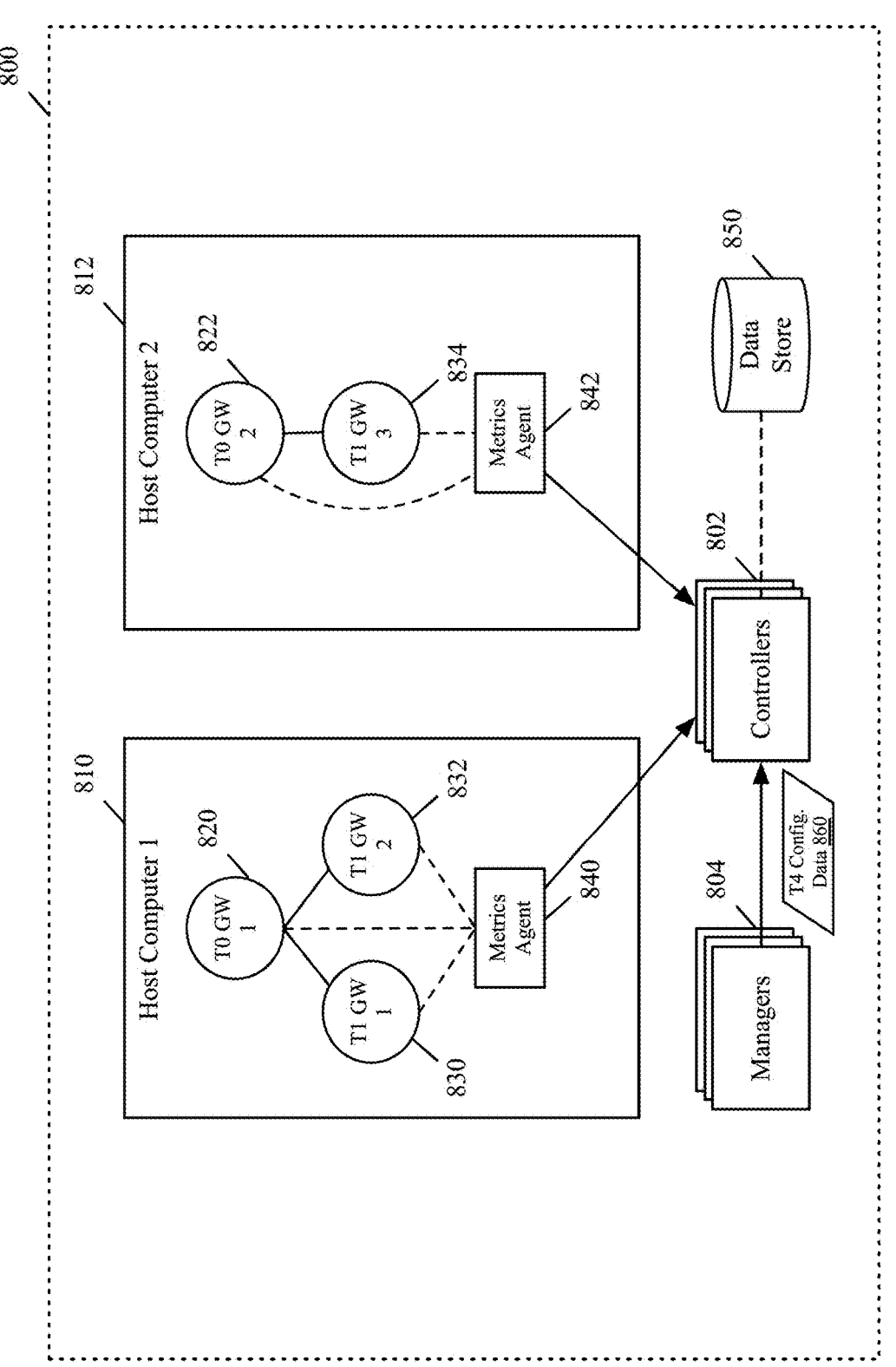
FIGS. 8A-C illustrate an example network configured by a controller set and a management server set for deploying edge routers for multiple tenants of the network.
Figure 8B:
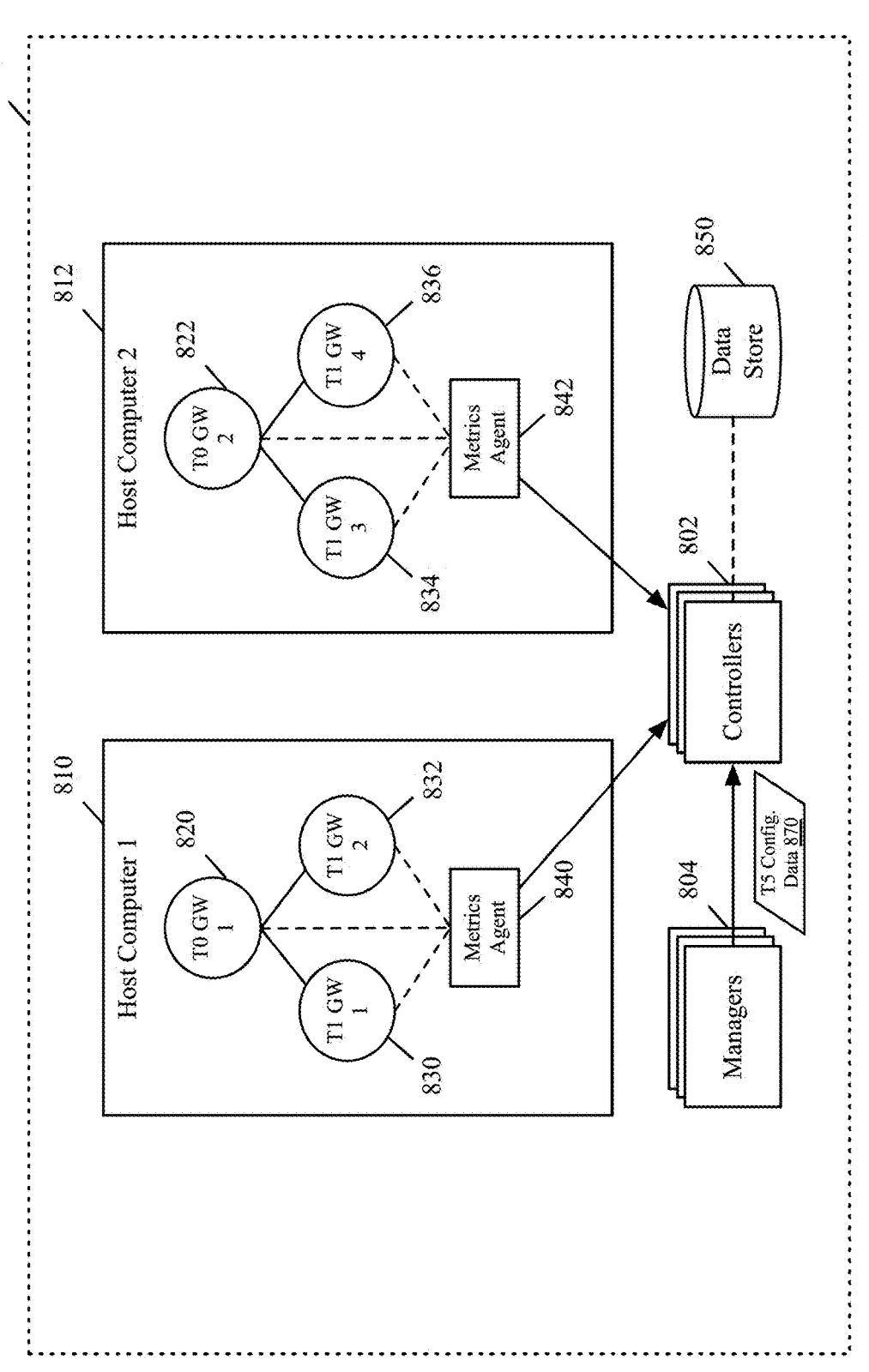
Figure 8C:
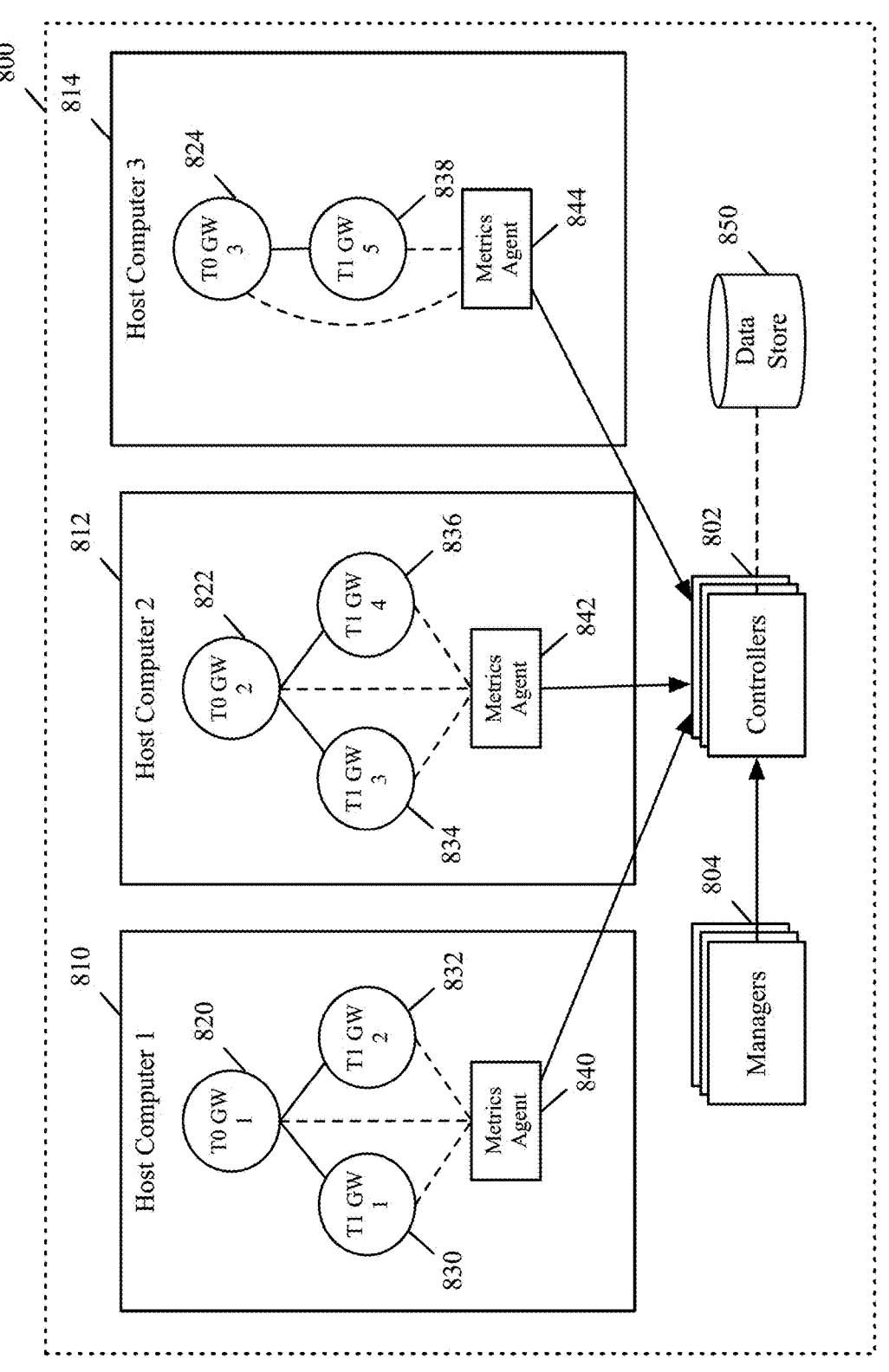

FIG. 8A-C illustrate an example network 800 configured by a controller set 802 and a management server set 804 for deploying edge routers for multiple tenants of the network 800. FIG. 8A illustrates the network 800 after the controller set 802 has deployed (e.g., using configuration data received from the manager set 804) on a first host computer 810 a first T0 gateway 820, a first T1 gateway 830 for a first tenant, and a second T2 gateway 832 for a second tenant. The first T0 gateway 820 is used by both the first and second tenants.

The controller set 802 has also deployed (e.g., using configuration data received from the managers 804) on a second host computer 812 a second T0 gateway 822 for the network 800, and a third T1 gateway 834 for a third tenant. In this figure, only the third tenant uses the second T0 gateway 822. The T0 gateways 820-822 and the T1 gateways 830-834 are in some embodiments deployed as individual machines (e.g., VMs, containers, pods) on the host computers 810-812. In other embodiments, they are deployed as one machine on each of the host computers 810-812 (i.e., each host computer deploys one machine for implementing all of the T0 and T1 gateways it executes). In some embodiments, the controller set 802 also stores configuration data for each gateway 820-822 and 830-834 and each host computer 810-812 in the data store 850.

Each host computer 810-812 executes a metrics collection agent 840-842 for collecting metrics related to the host computers 810-812, T0 gateways 820-822, T1 gateways 830-834, and the data message flows traversing them. The metrics collection agents 840-842 provide the metrics to the controller set 802, which uses them to monitor the load on the host computers 810-812 and/or the load on the T0 gateways 820-822. In some embodiments, the controller set 802 stores the metrics in a local data store 850. Conjunctively or alternatively, the controller set 802 uses the metrics to generate a set of one or more values and stores the generated values in the data store 850. Examples of values generated by the controller set 802 using the metrics include bandwidth utilization values, memory utilization values, and CPU utilization values. Any suitable metrics can be used to determine the load on the host computers 810-812 and/or the T0 gateways 820-822.

In this figure, the controller set 802 receives, from the manager set 804 (which received it from a network administrator, in some embodiments), configuration data 860 for configuring a new T1 gateway for a new fourth tenant in the network 800. The configuration data 860 in some embodiments specifies a desired size of the new T1 gateway, the desired CPU of the new T1 gateway, and the desired memory of the new T1 gateway. Any suitable configuration data for configuring a new T1 gateway in a network can be included in the configuration data 860 for the fourth tenant, such as network addresses (e.g., IP addresses, media access control (MAC) addresses) to assign the T1 gateway, specification of one or more services (e.g., middlebox services) to implement on the T1 gateway, rules (e.g., forwarding rules, NAT rules, firewall rules, etc.) to configure on the T1 gateway, etc.

Using the metrics and values it generated, the controller set 802 determines where to deploy the new T1 gateway: on the first host computer 810, on the second host computer 812, or on a new host computer.

FIG. 8B illustrates the network 800 after the controller set 802 has deployed a new fourth T1 gateway 836 for the new fourth tenant on the second host computer 812. The controller set 802 is able to deploy the fourth T1 gateway 836 on the second host computer 812 after determining that the additional traffic will not overload the T0 gateway 822 or the host computer 812. The controller set 802 in some embodiments also stores the configuration data 860 for the fourth T1 gateway 836 in the data store 850.

In some embodiments, before deploying the fourth T1 gateway 836 on the second host computer 812, the controller set 802 determines that the first host computer 810 and/or the first T0 gateway 820 could not handle the additional traffic without being overloaded. After deploying the fourth T1 gateway 836, the fourth tenant can send traffic to and from the network 800 using the T0 gateway 822 and within the network 800 using the T1 gateway 836.

In this figure, the controller set 802 receives, from the manager set 804 (which received it from a network administrator, in some embodiments), configuration data 870 for configuring a new T1 gateway for a new fifth tenant in the network 800. The configuration data 870 in some embodiments specifies a desired size of the new T1 gateway, the desired CPU of the new T1 gateway, and the desired memory of the new T1 gateway. Any suitable configuration data for configuring a new T1 gateway in a network can be included in the configuration data 870 for the fifth tenant.

FIG. 8C illustrates the network 800 after the controller set 802 has deployed a new fifth T1 gateway 838 for the new fifth tenant on a new third host computer 814. To deploy the new T1 gateway 838 on the new host computer 814, the controller set 802 also deployed a new T0 gateway 824 for the network 800 on the third host computer 814 and a metrics collection agent 844 on the third host computer 814.

The controller set 802 deployed the new T1 gateway 838 on a new host computer 814 after determining that neither the first host computer 810 nor the second host computer 812 could handle the additional traffic of the fifth tenant. As such, the controller set 802 deploys a new T0 gateway 824 for the network 800, and connects the fifth tenant's T1 gateway 838 to it to connect to one or more external networks. After deploying the fifth T1 gateway 838, the fifth tenant can send traffic to and from the network 800 using the T0 gateway 824 and within the network 800 using the T1 gateway 838. In some embodiments, the controller set 802 also stores the configuration data 870 for the new T1 gateway 838 in the data store 850.

Figure 9:
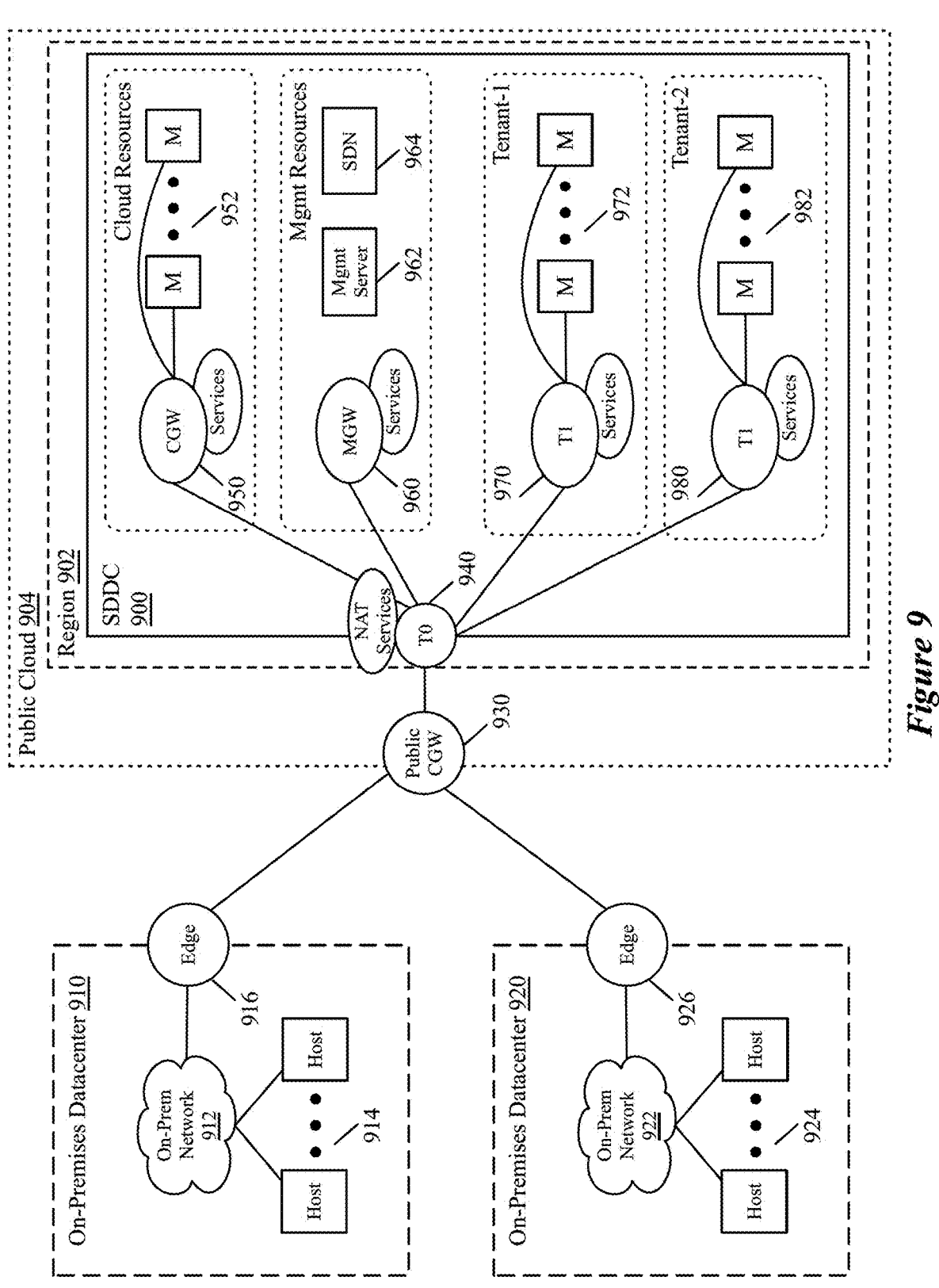
FIG. 9 illustrates an example SDDC, deployed in a region of a public cloud, that uses one T0 gateway to connect to two on-premises datacenters.

FIG. 9 illustrates an example SDDC 900 deployed in a particular region 902 of a public cloud 904 that connects to two on-premises datacenters 910 and 920. Each on-premises datacenter 910 and 920 respectively includes an on-premises network 912 and 922, a set of one or more host computers 914 and 924, and an edge forwarding element 916 and 926. The edge forwarding elements 916 and 926 in some embodiments each includes a router that performs the data message forwarding operations of the edge. In such embodiments, the next-hop forwarding records of these edges are routing records used by the routers to forward data messages to and from their on-premises datacenters 910 and 920.

Each edge forwarding element 916 and 926 in some embodiments connects to the SDDC 900 through two or more forwarding devices (e.g., an MPLS (multiprotocol label switching) device, a cable modem router, a 5G router) of two or more communication service providers (e.g., a telephone company provider of an MPLS network, a cable modem provider of an ISP (Internet Service Provider), a wireless provider for the 5G connectivity). In some of these embodiments, each edge forwarding element 916 and 926 connects to the forwarding devices of the service providers through two or more physical ports of the edge forwarding element.

The on-premises datacenters 910 and 920 connect to the SDDC 900 through a public cloud gateway 930 of the public cloud 904. The public cloud gateway 930 connects to a T0 gateway 940 of the SDDC 900. The T0 gateway 940 connects to a CGW 950, an MGW 960, and two T1 gateways 970 and 980 for two tenants of the SDDC 900. The CGW 950 connects to one or more cloud machines 952 of the SDDC 900. In some embodiments, the CGW 950 also instantiates the machines 952, 972, and/or 982 in the SDDC 900. The MGW 960 connects to a management server 962 and an SDN 964 of the SDDC 900.

Each tenant is respectively associated with their own set of machines 972 and 982, which are the sources and destinations of their data message flows. Each tenant can send flows from their machines 972 or 982, through their T1 gateway 970 or 980, through the T0 gateway 940 and the public cloud gateway 930, and to the hosts 914 and/or 924 of the on-premises datacenters 910 and 920. In this figure, the T0 gateway 940 can handle the load of both tenant's T1 gateways 970 and 980. In some embodiments, the T0 gateway 940 and the T1 gateways 970 and 980 all execute on a same host computer (not shown) in the SDDC 900. In such embodiments, they can execute as individual machines (e.g., VMs) or as a single machine on the host computer.

The machines 972 and 982 in some embodiments execute on a set of host computers separate from the host computer executing the gateways 940, 970, and 980. In other embodiments, at least one of the machines 972 and 982 executes on the same host computer as the gateways 940, 970, and 980.

In some embodiments, the edge forwarding elements 916 and 926 forward flows to and from the public cloud gateway 930 through VPN connections (e.g., tunnels). In such embodiments, the T0 gateway 940 performs NAT services on the data message flows it receives from the T1 gateways 970 and 980 before sending them to the on-premises datacenters 910 and 920.

Each of the CGW 950, MGW 960, and T1 gateways 970 and 980 in some embodiments performs one or more services (e.g., middlebox services) on the data messages it forwards within the SDDC 900 and to and from the SDDC 900.

Figure 10:
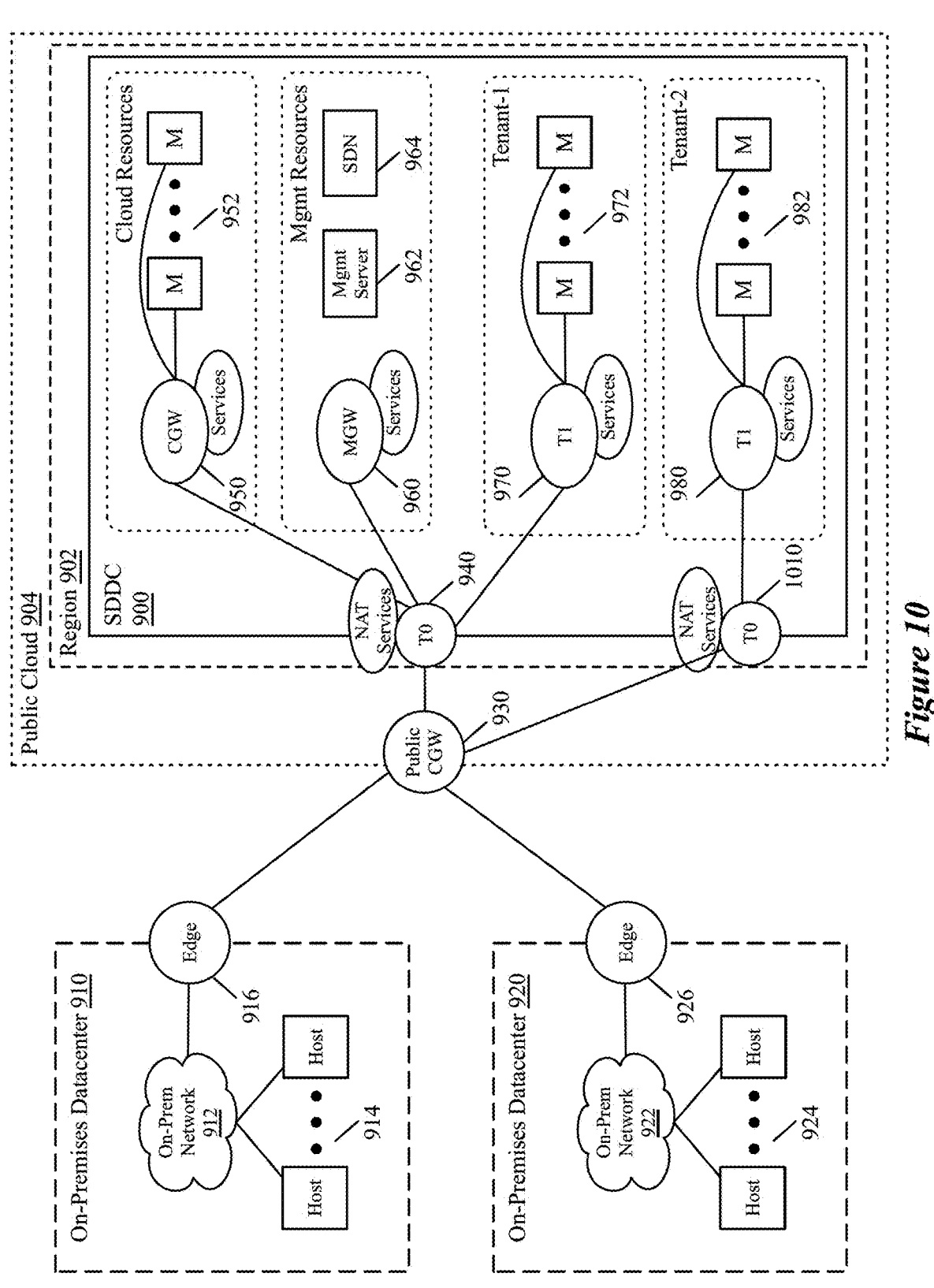
FIG. 10 illustrates the example SDDC after deploying an additional T0 gateway to connect to the two on-premises datacenters.

FIG. 10 illustrates the same SDDC 900, but the second tenant's T1 gateway 980 is connected to a different T0 gateway 1010 of the SDDC 900. In this figure, the first T0 gateway 940 is unable to handle the load of both the first and the second tenants, so the second tenant's T1 gateway 980 connects to another T0 gateway 1010 of the SDDC 900 to reach the on-premises datacenters 910 and 920. In this example, the first T0 gateway 940 and the first tenant's T1 gateway 970 execute on a first host computer (not shown) of the SDDC 900, and the second T0 gateway 1010 and the second tenant's T1 gateway 980 execute on a second host computer (not shown) of the SDDC 900.

In some embodiments, the second T1 gateway 980 is migrated to the second host computer after a controller set (not shown) of the SDDC 900 determined that the first host computer can no longer handle the load of both T1 gateways 970 and 980. The controller set of the SDDC 900 in some embodiments configures the additional T0 gateway 1010 and migrates the second tenant's T1 gateway 980 after the second tenant's amount of flows increased, causing an overload of the first T0 gateway 940 and/or the host computer on which it executes.

Rather than configuring a new T0 gateway 1010 on a new host computer in the SDDC 900 and migrating the second tenant's T1 gateway 980 to this host computer, some embodiments instead configure the new T0 gateway 1010 on a host computer in one of the on-premises datacenters 910 and 920 and migrate the T1 gateway 980 to that on-premises datacenter. This is beneficial in embodiments where migration of the T1 gateway 980 happens with or without VPN access. It is performed in some embodiments for cost optimization and/or disaster recovery of a remote SDDC.

Additionally, migrating the entire T1 gateway 980 can also transfer the services managed by the T1 gateway 980.

Alternatively, some embodiments migrate a T1 gateway from one SDDC to another. In such embodiments, a tenant's T1 gateway is migrated from a first SDDC to a second SDDC if underlying resources of the first SDDC are a constraint. The controller set in some embodiments first migrates the T1 gateway from one segment to the second SDDC with L2 network, and then migrates VPN constraints and a public IP address for one VPN endpoint to the second SDDC. This can also be performed for workload VMs. In such embodiments, the public IP addresses applicable for the target segments are attached to the T1 gateway. Then, synchronization and desynchronization are performed across the SDDCs. In some embodiments, T1 gateway migration from one SDDC to another SDDC along with Public IP addresses that are used as VPN LEP is based on the resource consumption of the T1 gateway.

Routed CGWs are connected to an overlay network. Workload VMs behind routed CGWs communicate with other CGWs' (including a default CGW) workloads. They also reach the Internet using Elastic IP (EIP). Customers configure route aggregation to enable routed CGW workloads to communicate over transit connect and/or direct connect (i.e., an Intranet endpoint) or over connected VPC (i.e., a services endpoint). Only explicitly configured network addresses in route aggregation prefix lists are advertised externally, giving customers fine-grained control over reachability to workloads on additional CGW.

NATted CGWs require NAT to be configured to ensure connectivity to the SDDC's overlay network. As with routed CGWs, workloads on NATted CGWs communicate externally when using route aggregation. Addresses behind the NATed CGW are not advertised, which enables creation of overlapping Classless Inter-Domain Routing network addresses (CIDRs) in the SDDC. Advanced customers find this capability useful when supporting tenants or applications with overlapping IP addresses. This lets customers avoid renumbering (reassigning IP addresses to) their applications when they migrate them to the cloud and save a significant amount of time, effort, and risk.

Though there are multiple active edges in a network, all the stateful services (e.g., NAT, VPN, etc.) happen in the active edge of a default edge pair. Therefore, scaling some of the stateful services and taking advantage of the extra edges is needed.

Some embodiments begin with deploying VPN on higher-level edge routers (e.g., gateways, T0 gateways) based on the maximum VPN throughput support. After this, one or more lower-level edge routers (e.g., VRFs, T1 gateways) are migrated from a first higher-level edge router to a second higher-level edge router based on the resource consumption of the higher-level edge routers and/or based on received user requirements.

These embodiments use multiple higher-level routers based on VPN underlying support per higher-level edge router. In such embodiments, CFCs are programmed on the second higher-level edge router. This is useful when the network administrator changes their requirements for the network, such as requesting a custom throughput of greater than >1 Gbps.

After deploying higher-level and lower-level edge routers, some embodiments have a maximum VPN throughput of 7 Gbps. In such embodiments, the maximum number of CFCs supported is 7 on a particular higher-level edge router.

The controller of the network then monitors the resource consumption and number of CFCs that are already provisioned in the network. When the controller determines that the CFC limit is increasing past the VPN supported throughput, the controller deploys an additional CFC on another higher-level edge router. In some of these embodiments, the controller maintains a table (e.g., in a local data store) mapping each CFC to the higher-level edge router on which it is deployed. The manager of the network in some embodiments maintains a table specifying VPN configurations, EIPs, and firewall rules for each higher-level edge router.

In some embodiments, the controller associates an already deployed lower-level edge router with a new higher-level edge router and connects them. In such embodiments, the controller migrates the VPN public IP LEP of the lower-level edge router from its originally connected higher-level edge router to the new higher-level edge router. In some of these embodiments, the controller migrates and redirects ("punts") VPN configurations from the originally connected higher-level edge router to the new higher-level edge router.

Public IP NAT rules are also migrated from the originally connected higher-level edge router's firewall to the new higher-level edge router's firewall. Firewall rules for VPN endpoint are also provided to the new higher-level edge router.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
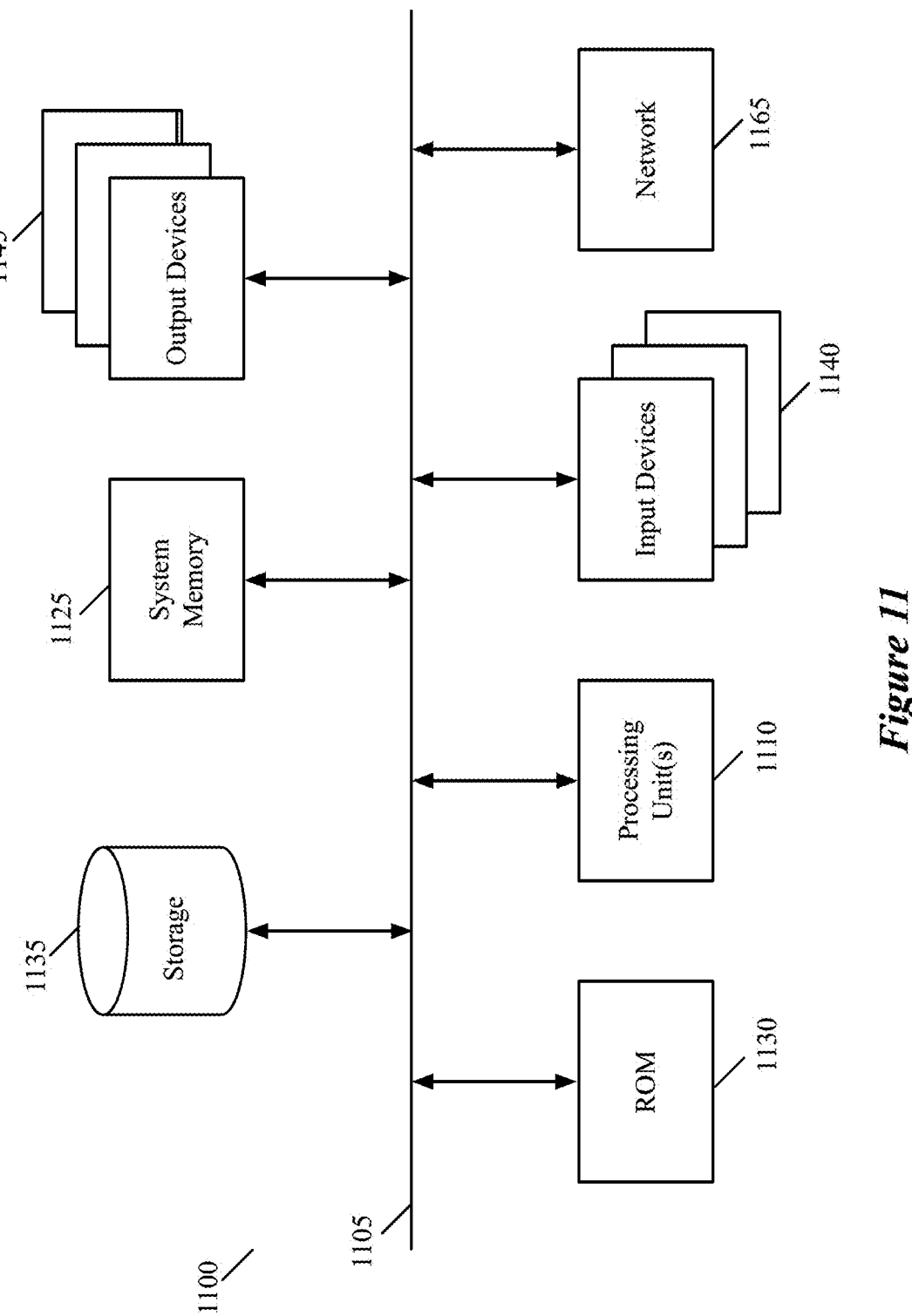
FIG. 11 conceptually illustrates a computer system with which some embodiments of the invention are implemented.

FIG. 11 conceptually illustrates a computer system 1100 with which some embodiments of the invention are implemented. The computer system 1100 can be used to implement any of the above-described computers and servers. As such, it can be used to execute any of the above described processes. This computer system includes various types of non-transitory machine readable media and interfaces for various other types of machine readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments. The read-only-memory (ROM) 1130 stores static data and instructions that are needed by the processing unit(s) 1110 and other modules of the computer system. The permanent storage device 1135, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the computer system. The input devices 1140 include alphanumeric keyboards and pointing devices (also called "cursor control devices"). The output devices 1145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples computer system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of computer system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for configuring edge routers in a first network, the method comprising:
configuring on a first compute node of the first network (i) a first higher-level edge router and (ii) a set of lower-level edge routers, each lower-level edge router configured for a different set of subnetworks defined in the first network and connected to an external second network through the first higher-level edge router;
detecting a condition that requires a particular lower-level edge router for a particular subnetwork to be moved to another compute node;
configuring the particular lower-level edge router to operate on a second compute node below a second higher-level edge router operating on the second compute node to connect the particular lower-level edge router to the external second network; and
receiving configuration data for deploying an additional lower-level edge router in the first network; and
examining load on the first and second compute nodes to determine on which compute node to deploy the additional lower-level edge router.

2. The method of claim 1, wherein the first network is an underlay network and the different sets of subnetworks are different overlay networks.

3. The method of claim 1, wherein the first network is an overlay network of a first virtual private cloud (VPC) that is defined in a set of one or more datacenters of a cloud, and the different sets of subnetworks are other overlay networks defined for other VPCs defined in the datacenter set.

4. The method of claim 1, wherein the first and second compute nodes are first and second machines executing on first and second host computers.

5. The method of claim 4, wherein the machines are virtual machines (VMs).

6. The method of claim 4, wherein the machines are pods.

7. The method of claim 1, wherein the first and second compute nodes are first and second host computers.

8. The method of claim 7, wherein each higher-level edge router and each lower-level edge router executes as a machine on its respective host computer.

9. The method of claim 1, wherein each lower-level edge router is a different lower-level edge router for a different tenant.

10. The method of claim 1, wherein the first and second higher-level edge routers are Tier-0 (T0) gateways, and the set of lower-level edge routers is a set of Tier-1 (T1) gateways.

11. The method of claim 1, wherein the first and second higher-level edge routers are gateways, and the set of lower-level edge routers is a set of virtual routing and forwarding (VRF) instances.

12. The method of claim 1, wherein configuring the particular lower-level edge router to operate on the second compute node comprises migrating the particular lower-level edge router from the first compute node to the second compute node.

13. The method of claim 1, wherein detecting the condition comprises:
monitoring load on the first higher-level edge router by the set of lower-level edge routers; and
determining that the load on the first higher-level edge router has exceeded a particular threshold.

14. The method of claim 1, wherein detecting the condition comprises:
monitoring load on the first compute node by the set of lower-level edge routers; and
determining that the load on the first compute node has exceeded a particular threshold.

15. The method of claim 1 further comprising:
receiving configuration data for deploying an additional lower-level edge router in the first network; and
examining load on the first and second compute nodes to determine on which compute node to deploy the additional lower-level edge router.

16. The method of claim 1 further comprising, after determining that the load on the first compute node will not exceed a particular threshold if the additional lower-level edge router is configured on the first compute node, configuring the additional lower-level edge router to operate on the first compute node below the first higher-level edge router operating on the first compute node to connect the additional lower-level edge router to the external second network.

17. The method of claim 1 further comprising, after determining (i) that the load on the first compute node will exceed a particular threshold if the additional lower-level edge router is configured on the first compute node and (ii) that the load on the second compute node will not exceed the particular threshold if the additional lower-level edge router is configured on the second compute node, configuring the additional lower-level edge router to operate on the second compute node below the second higher-level edge router operating on the second compute node to connect the additional lower-level edge router to the external second network.

18. The method of claim 1 further comprising, after determining that the load on the first compute node and the load on the second compute node will exceed a particular threshold if the additional lower-level edge router is respectively configured on the first compute node or the second compute node:

deploying a third higher-level edge router on a third compute node; and configuring the additional lower-level edge router to operate on the third compute node below the third higher-level edge router operating on the third compute node to connect the additional lower-level edge router to the external second network.

19. The method of claim 1, wherein the first and second higher-level edge routers exchange a first plurality of data message flows between a plurality of machines of the first network and the external second network, and the set of lower-level edge routers exchange a second plurality of data message flows between the plurality of machines of the first network.

20. A non-transitory machine readable medium storing a program for execution by at least one processing unit for configuring edge routers in a first network, the program comprising sets of instructions for:

configuring on a first compute node of the first network (i) a first higher-level edge router and (ii) a set of lower-level edge routers, each lower-level edge router configured for a different set of subnetworks defined in the first network and connected to an external second network through the first higher-level edge router;

detecting a condition that requires a particular lower-level edge router for a particular subnetwork to be moved to another compute node;

configuring the particular lower-level edge router to operate on a second compute node below a second higher-level edge router operating on the second compute node to connect the particular lower-level edge router to the external second network; and receiving configuration data for deploying an additional lower-level edge router in the first network; and examining load on the first and second compute nodes to determine on which compute node to deploy the additional lower-level edge router.

* * * * *